(12) United States Patent
Dzolovic et al.

(10) Patent No.: US 10,760,709 B2
(45) Date of Patent: Sep. 1, 2020

(54) HANDLE FOR VALVE ASSEMBLY

(71) Applicant: Salco Products, Inc., Lemont, IL (US)

(72) Inventors: Vedran Dzolovic, Norridge, IL (US); David Clugg, Elmhurst, IL (US); Lawrence McMullin, Elwood, IL (US); James McLaughlin, New Lenox, IL (US)

( * ) Notice: Subject to any disclaimer, the term of this patent is extended or adjusted under 35 U.S.C. 154(b) by 0 days.

(21) Appl. No.: 16/275,022

(22) Filed: Feb. 13, 2019

(65) Prior Publication Data
US 2019/0178414 A1 Jun. 13, 2019

Related U.S. Application Data

(63) Continuation of application No. 14/744,628, filed on Jun. 19, 2015, now Pat. No. 10,274,101.

(60) Provisional application No. 62/031,650, filed on Jul. 31, 2014, provisional application No. 62/014,932, filed on Jun. 20, 2014.

(51) Int. Cl.
*F16K 35/10* (2006.01)
*F16K 31/60* (2006.01)
*F16K 5/00* (2006.01)

(52) U.S. Cl.
CPC .............. *F16K 35/10* (2013.01); *F16K 5/00* (2013.01); *F16K 31/602* (2013.01)

(58) Field of Classification Search
USPC .................................................. 251/101–110
See application file for complete search history.

(56) References Cited

U.S. PATENT DOCUMENTS

| 2,250,356 A | 7/1941 | Brumbaugh |
| 3,012,584 A | 12/1961 | DuPerow et al. |
| 3,656,710 A | 4/1972 | Shaw |
| 3,764,103 A | 10/1973 | Oliverio |
| 3,930,634 A | 1/1976 | Loveless |
| 3,981,481 A | 9/1976 | Reedy et al. |
| 4,141,535 A | 2/1979 | Reedy et al. |
| 4,549,716 A | 10/1985 | Warren |

(Continued)

FOREIGN PATENT DOCUMENTS

EP 0560247 A1 9/1993

OTHER PUBLICATIONS

U.S. Patent & Trademark Office, Office Action in U.S. Appl. No. 15/147,831, dated Sep. 19, 2017.

*Primary Examiner* — Daphne M Barry
(74) *Attorney, Agent, or Firm* — Leydig, Voit & Mayer, Ltd.

(57) ABSTRACT

A handle assembly is provided for an outlet valve of a tank car wherein the outlet valve has a valve stem rotatable about an axis and is operative to open and close the outlet valve. The handle assembly includes a valve handle for manually opening the outlet valve, a rotatable shaft coupled to the handle, and a coupling coupled to the outlet valve and selectively coupleable to the shaft. A valve rotation control structure includes a first movement control component on one of the coupling and the shaft. The valve rotation control structure is configured to permit the coupling or shaft to move parallel to the axis of the valve stem between a first locked position and a second rotatable position and to rotate about the axis of the valve stem between a first valve closed position and a second valve open position at the second rotatable position.

25 Claims, 22 Drawing Sheets

(56) References Cited

U.S. PATENT DOCUMENTS

| | | | |
|---|---|---|---|
| 5,490,660 | A | 2/1996 | Kamezawa |
| 5,544,675 | A | 8/1996 | Dean |
| 5,931,444 | A | 8/1999 | Chronister |
| 6,138,715 | A | 10/2000 | LaLone et al. |
| 6,651,697 | B2 | 11/2003 | Gonsior |
| 7,178,781 | B2 | 2/2007 | Trappa |
| 9,623,881 | B2 | 4/2017 | Bertram et al. |
| 9,694,828 | B2 | 7/2017 | Saxton et al. |
| 9,746,873 | B2 | 8/2017 | Thompson et al. |
| 9,828,006 | B2 | 11/2017 | Thompson et al. |
| 10,060,549 | B2 | 8/2018 | Becherer |
| 2014/0261072 | A1 ‡ | 9/2014 | Thompson ............... G05G 1/08 105/358 |
| 2015/0090150 | A1 ‡ | 4/2015 | Bertram ................ B60P 3/2205 105/358 |
| 2015/0336590 | A1 | 11/2015 | Saxton et al. |
| 2016/0075347 | A1 | 3/2016 | Thompson et al. |
| 2016/0327180 | A1 | 11/2016 | Becherer |

‡ imported from a related application

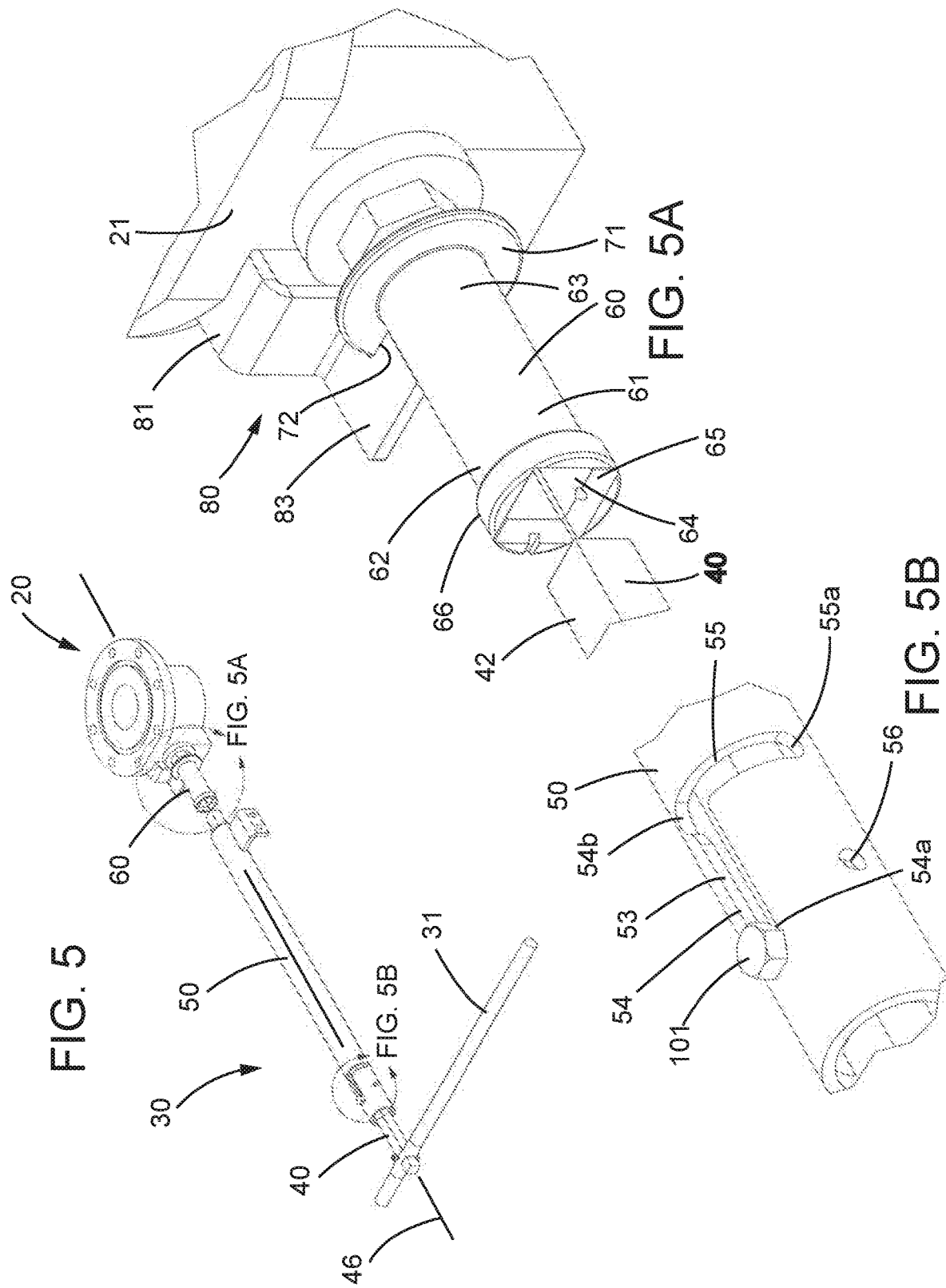

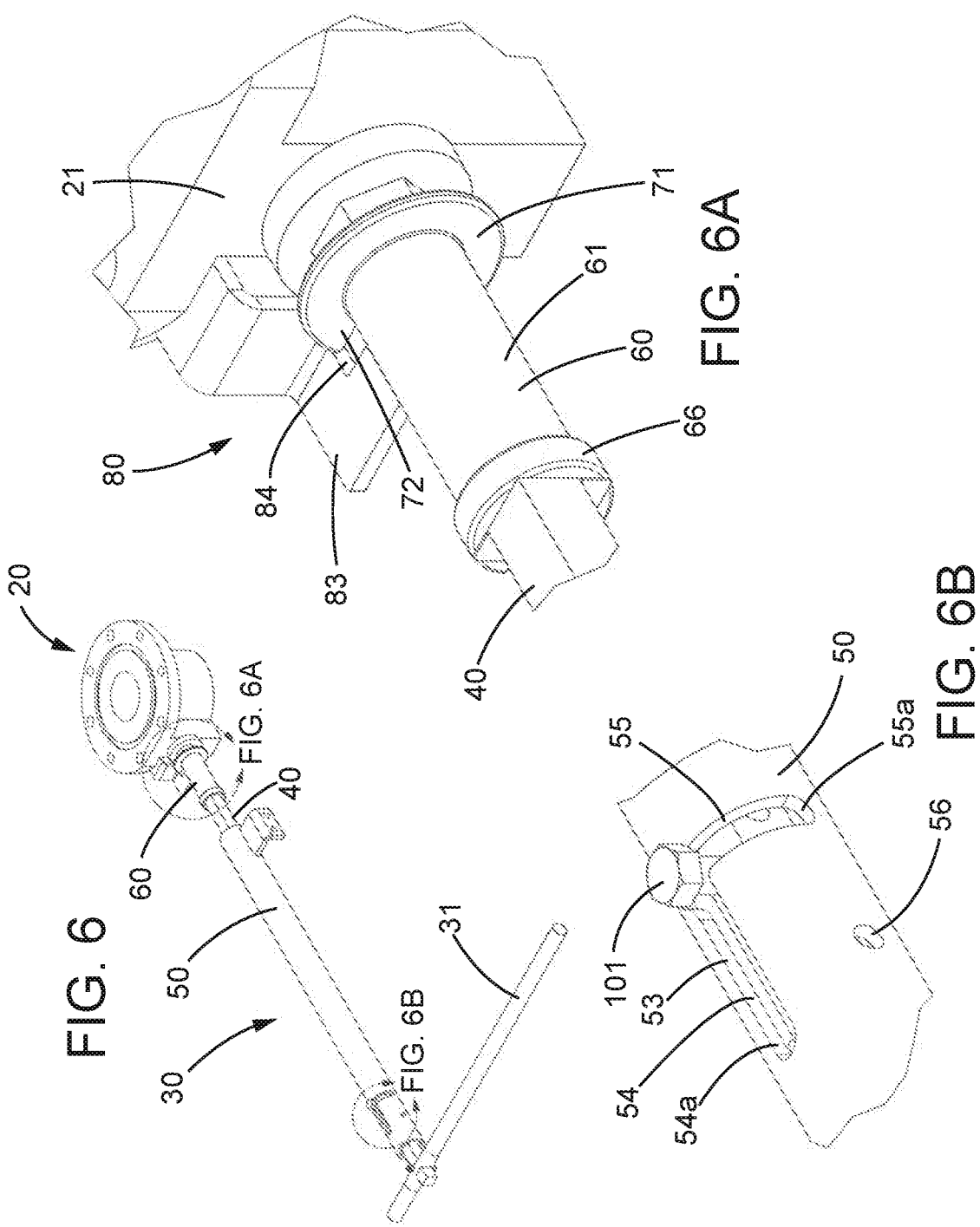

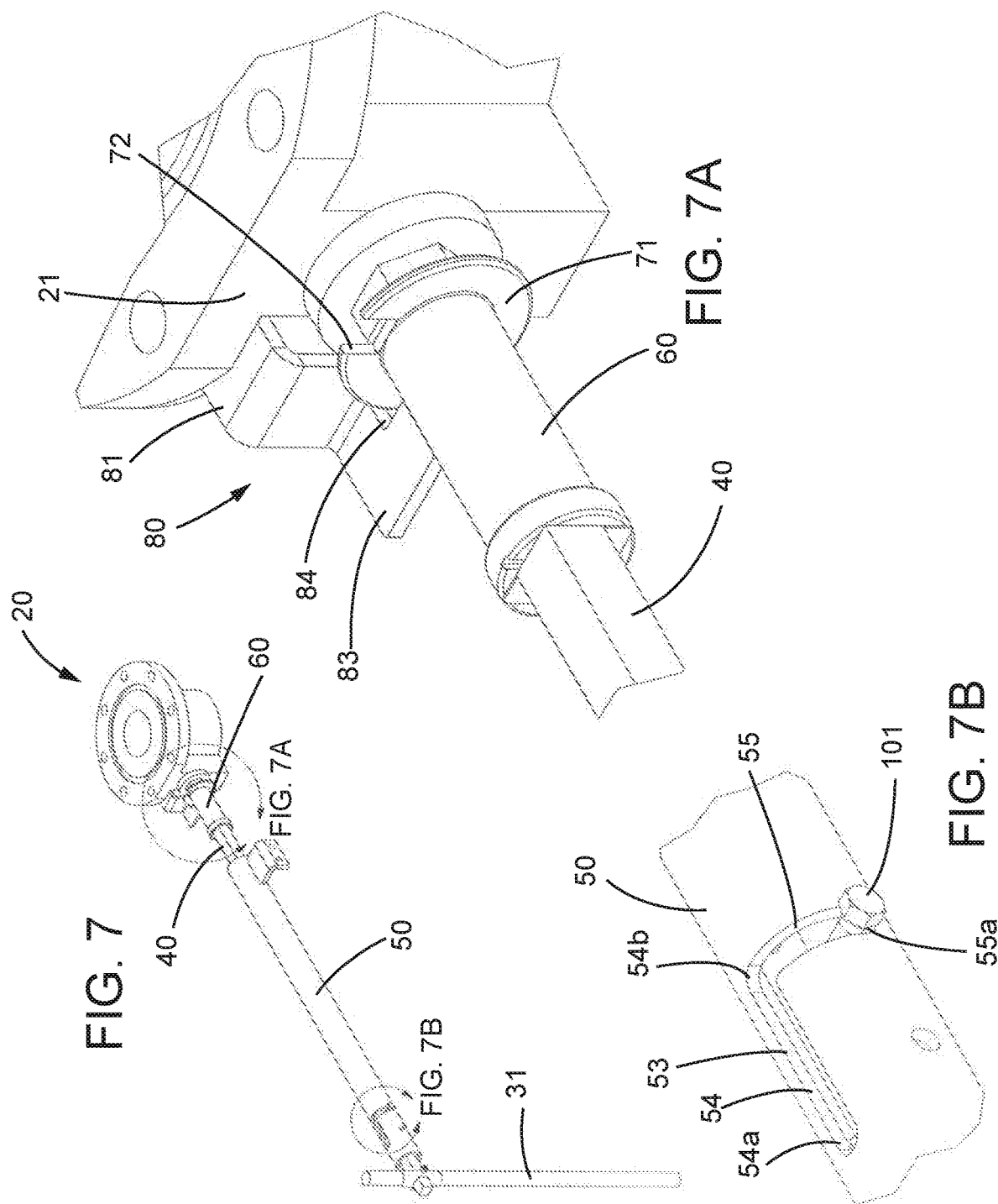

HANDLE FOR VALVE ASSEMBLY

CROSS REFERENCE TO RELATED APPLICATIONS

This application is a continuation application that claims priority pursuant to Title 35 U.S.C. § 120 to U.S. application Ser. No. 14/744,628, filed Jun. 19, 2015, entitled "Handle for Valve Assembly," which, in turn, claims priority, pursuant to Title 35 U.S.C. § 119(e) to U.S. Provisional Application Ser. No. 62/014,932, filed Jun. 20, 2014, and Ser. No. 62/031,650, filed Jul. 31, 2014, both entitled "Handle for Valve Assembly." The entire content of the above-identified applications is hereby incorporated by reference herein, as if fully set forth.

TECHNICAL FIELD

This disclosure relates generally to handles for valve assemblies for railroad tank cars, and, more particularly, to a disconnectable handle for use with bottom outlet valve assemblies used on railroad tank cars.

Railroad tank cars are used to transport material such as liquids through railway systems. A railroad tank car typically includes a bottom outlet valve assembly located on the underside of the car for unloading the transported materials. The bottom outlet valve assembly includes a rotatable valve member that may be selectively moved between closed and open positions to permit the discharge of the fluid from the tank car. Different types of rotatable valve members are used to control the discharge of fluid from the tank car. One type of rotatable valve member uses a rotatable ball mechanism. Other bottom outlet valve assemblies use a rotatable butterfly valve or a plug-style valve.

In some instances, railroad car accidents have resulted in the accidental opening of bottom outlet valves. Such accidental valve openings have caused spillage of liquids from the tank cars which in turn has caused fires and caused environmental contamination. As a result of such accidental openings, a desire has been created for systems or mechanisms that will prevent or minimize the likelihood of unintended or accidental opening of the valves.

The foregoing background discussion is intended solely to aid the reader. It is not intended to limit the innovations described herein, nor to limit or expand the prior art discussed. Thus, the foregoing discussion should not be taken to indicate that any particular element of a prior system is unsuitable for use with the innovations described herein, nor is it intended to indicate that any element is essential in implementing the innovations described herein. The implementations and application of the innovations described herein are defined by the appended claims.

SUMMARY OF THE DISCLOSURE

In one aspect, a handle assembly is provided for an outlet valve of a tank car wherein the outlet valve has a valve stem rotatable about an axis and is operative to open and close the outlet valve. The handle assembly includes a valve handle for manually opening the outlet valve, a rotatable shaft coupled to the handle, and a coupling coupled to the outlet valve and selectively coupleable to the shaft. A valve rotation control structure includes a first movement control component on the coupling, with the valve rotation control structure being configured to permit the coupling to move parallel to the axis of the valve stem between a first locked position and a second rotatable position and to rotate about the axis of the valve stem between a first valve closed position and a second valve open position at the second rotatable position.

In another aspect, a handle assembly is provided for an outlet valve of a tank car wherein the outlet valve has a valve stem rotatable about an axis and is operative to open and close the outlet valve. The handle assembly includes a valve handle for manually opening the outlet valve, a rotatable shaft coupled to the handle, and a coupling coupled to the outlet valve and selectively coupleable to the shaft. A valve rotation control structure includes a first movement control component on the shaft, with the valve rotation control structure being configured to permit the shaft to move parallel to the axis of the valve stem between a first locked position and a second rotatable position and to rotate about the axis of the valve stem between a first valve closed position and a second valve open position at the second rotatable position.

In still another aspect, a valve rotation control structure is provided for controlling an outlet valve of a tank car wherein the outlet valve has a valve stem rotatable about an axis and is operative to open and close the outlet valve. The tank car has a valve handle for manually opening the outlet valve, a rotatable shaft coupled to the handle, and a coupling coupled to the outlet valve and selectively coupleable to the shaft. The valve rotation control structure includes movement control recess on one of the shaft and the coupling, a movement control projection on another of the shaft and the coupling with the movement control projection being disposed within the movement control recess. The movement control recess and the movement control projection are configured to permit the shaft to move parallel to the axis of the valve stem between a first locked position and a second rotatable position and to rotate about the axis of the valve stem between a first valve closed position and a second valve open position only at the second rotatable position.

BRIEF DESCRIPTION OF THE DRAWINGS

FIG. 5 is a perspective view of the bottom outlet valve and a portion of the valve handle assembly of FIG. 2 at a locked position and with the valve closed;

FIG. 5A is an enlarged view of the encircled portion identified as 5A of FIG. 5;

FIG. 5B is an enlarged view of the encircled portion identified as 5B of FIG. 5;

FIG. 6 is a perspective view of the bottom outlet valve and a portion of the valve handle assembly similar to FIG. 6 but at a rotatable position and with the valve closed;

FIG. 6A is an enlarged view of the encircled portion identified as 6A of FIG. 6;

FIG. 6B is an enlarged view of the encircled portion identified as 6B of FIG. 6;

FIG. 7 is a perspective view of the bottom outlet valve and a portion of the valve handle assembly of FIG. 2 at a rotatable position and with the valve open;

FIG. 7A is an enlarged view of the encircled portion identified as 7A of FIG. 7;

FIG. 7B is an enlarged view of the encircled portion identified as 7B of FIG. 7;

DETAILED DESCRIPTION OF THE ILLUSTRATED EMBODIMENTS

Figure 1:
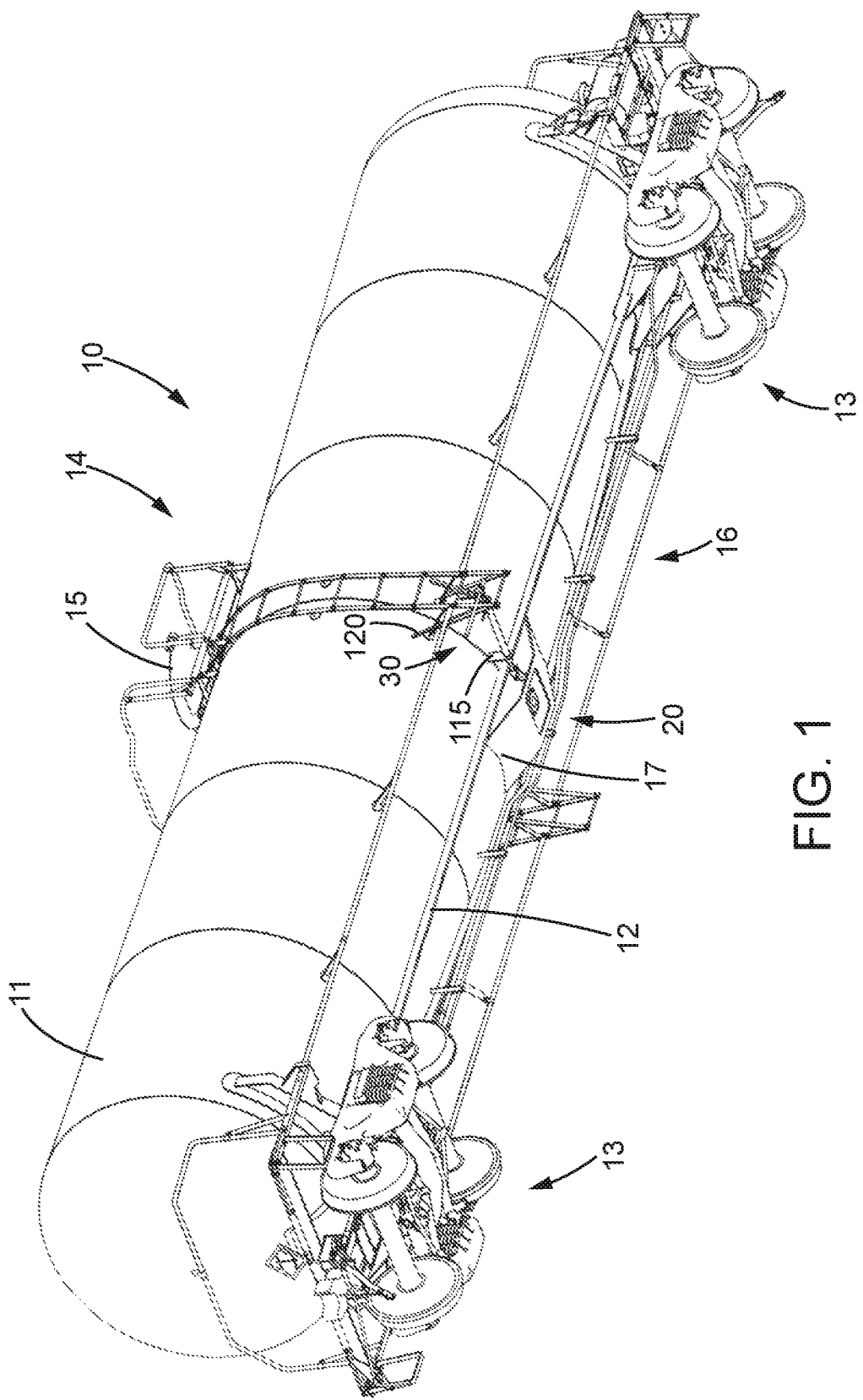
FIG. 1 is a perspective view of railroad tank car including a bottom outlet valve and a valve handle assembly according to the present disclosure.

A railroad tank car 10, equipped with a bottom outlet valve and a valve handle assembly according to the present disclosure, is illustrated in FIG. 1. The railroad tank car 10 includes an elongated cylindrical tank 11 for storing and transporting liquids as is known in the art. The cylindrical tank 11 is mounted on a frame 12 supported by longitudinally spaced wheeled trucks, generally designated 13, at opposite ends of the car.

The upper portion 14 of the cylindrical tank 11 may have a hatch opening (not shown) sealed by a hatch cover 15 that provides access to the interior of the cylindrical tank and for loading the tank, if desired. Valves (not shown) for loading and venting the cylindrical tank 11 may also be provided.

The bottom portion 16 of the cylindrical tank 11 is provided with an opening (not shown) at which a bottom outlet valve, generally designated 20, is mounted for controlling the discharge of fluid from within the cylindrical tank. A skirt 17 may extend downward from the portion 16 of the cylindrical tank 11 to protect the bottom outlet valve 20. Opening and closing of the bottom outlet valve 20 is achieved by manually manipulating a valve handle assembly, generally designated 30, associated with the bottom outlet valve. The valve handle assembly 30 may be mounted to the lower portion 16 of the cylindrical tank 11 with brackets 115 and 120 (FIG. 2) that are secured to both the bottom portion of the cylindrical tank and the valve handle assembly.

The side from which a workman operates the bottom outlet valve 20 to discharge liquid from the tank car 10 is referred to as the near side of the car. The opposite side or the side remote from the user of the outlet valve is referred to as the far side. For purposes of describing the structure and operation of certain aspects of the bottom outlet valve 20 and the valve handle assembly 30 of the present disclosure, "inner" means toward the longitudinal center of the railroad tank car 10. "Outer" means away from the longitudinal center of the railroad tank car 10.

Figure 2:
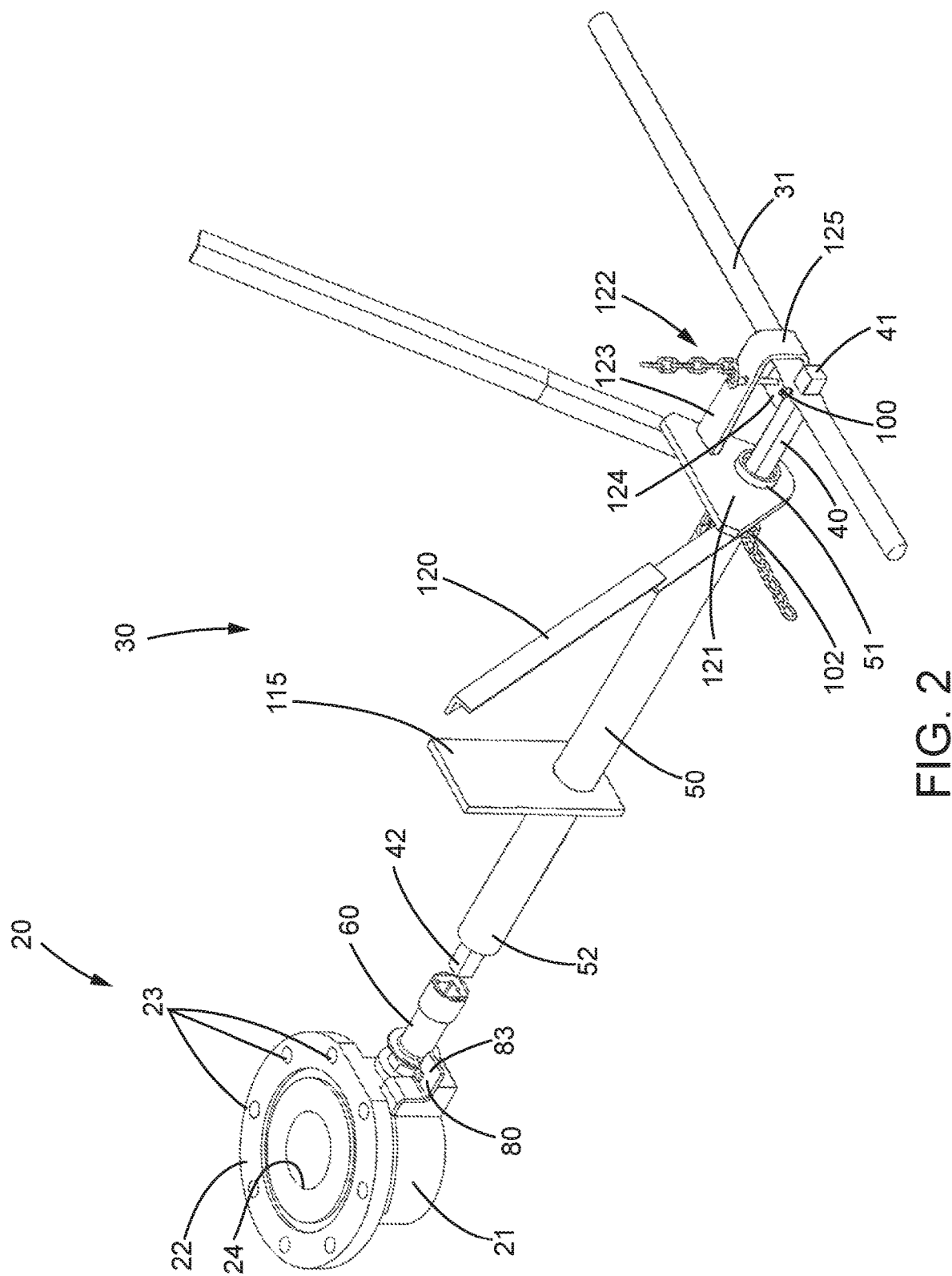
FIG. 2 is a perspective view of the bottom outlet valve and a valve handle assembly of FIG. 1.
Figure 4:
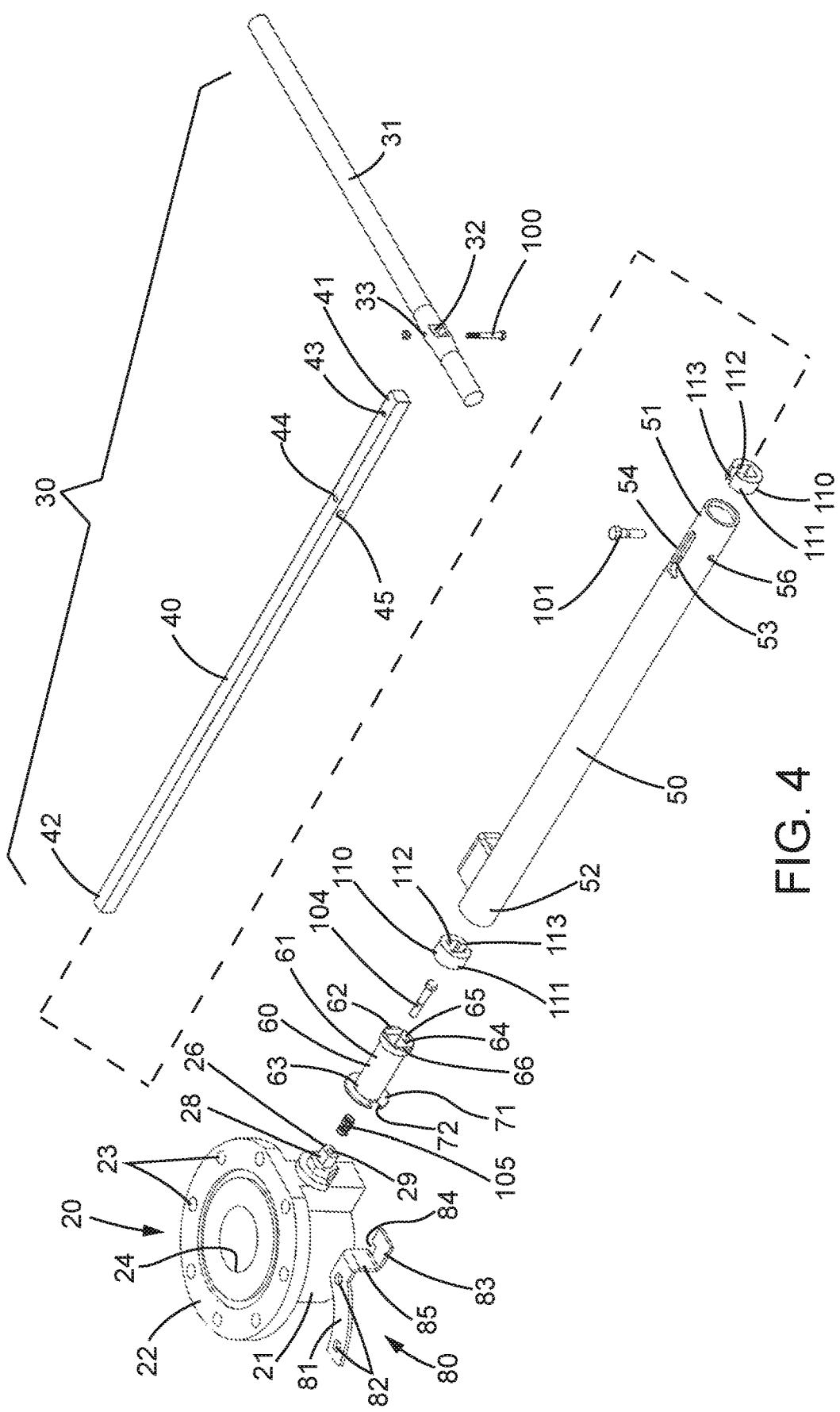
FIG. 4 is an exploded perspective view of the valve handle assembly together with the bottom outlet valve of FIG. 2.

Referring to FIGS. 2 and 4, the bottom outlet valve 20 and the valve handle assembly 30 are depicted in greater detail. Bottom outlet valve 20 has a body 21 configured to be secured to the tank car 10 through generally annular flange 22 at an upper surface of the body. Generally annular flange 22 may have a plurality of spaced apart holes 23 through which fasteners such as bolts (not shown) may pass to secure the bottom outlet valve 20 to the tank car 10 in alignment with the opening (not shown) in the bottom portion 16 of the cylindrical tank 11.

Figure 5C:
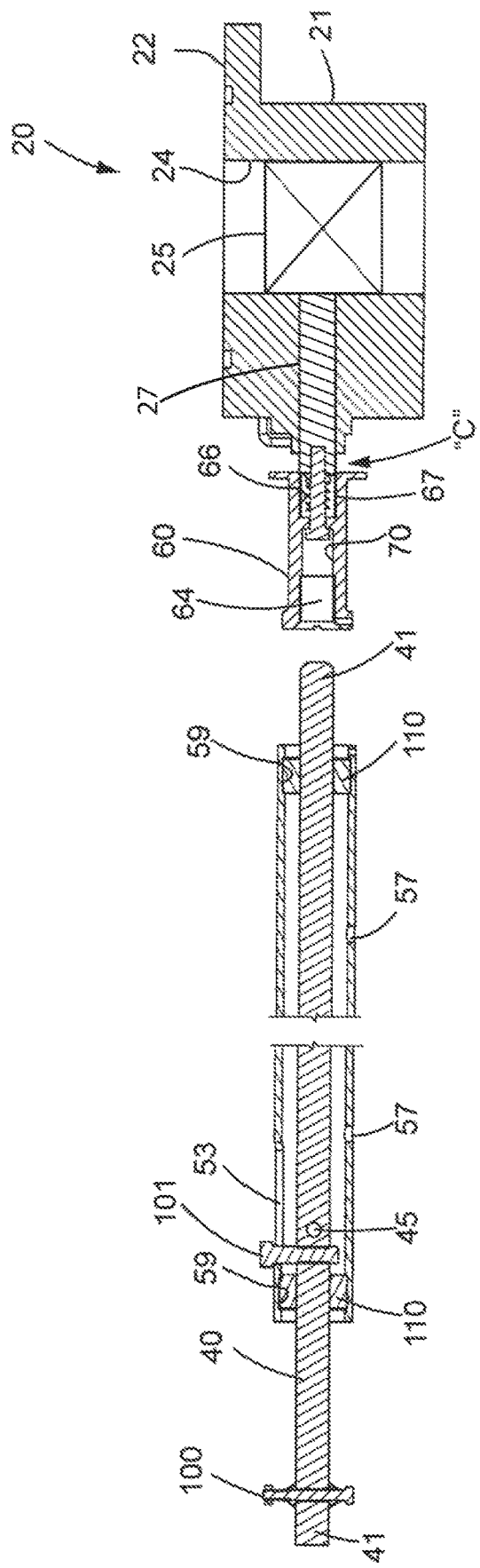
FIG. 5C is a sectional view of the bottom outlet valve and valve handle assembly of FIG. 5.

Body 21 of valve 20 has a central bore 24 through which fluid from the cylindrical tank 11 may flow. Flow through the central bore 24 is controlled by a valve sealing mechanism configured schematically as a valve ball 25 (FIG. 5C). Bottom outlet valve 20 may be configured as any type of desired outlet valve including ball valves, butterfly valves, and plug-style valves. The valve ball 25 (or other type of valve sealing mechanism) includes a valve stem 26 (FIG. 4) that extends through a bore 27 (FIG. 5C) in the valve body 21 to control opening and closing of the valve ball. Valve stem 26 is depicted with a generally circular cross section having pair of oppositely facing flat surfaces 28 and a threaded bore 29. The shape and configuration of the valve stem 26 as well as its direction of rotation to open and close the valve ball 25 may change depending on the manufacturer of the bottom outlet valve 20. In addition, while ball valves and butterfly valves open and close upon 90° of rotation, other valve assemblies may open and close upon 180° of rotation.

The valve handle assembly 30 includes an elongated valve handle 31 that may be manually manipulated by a user or operator of the valve handle assembly to move the bottom outlet valve between the open and closed positions. The valve handle 31 includes a rectangular bore 32 that extends through the valve handle. A cylindrical bore 33 extending through the valve handle 31 is generally perpendicular to and intersects with the rectangular bore 32.

Figure 3:
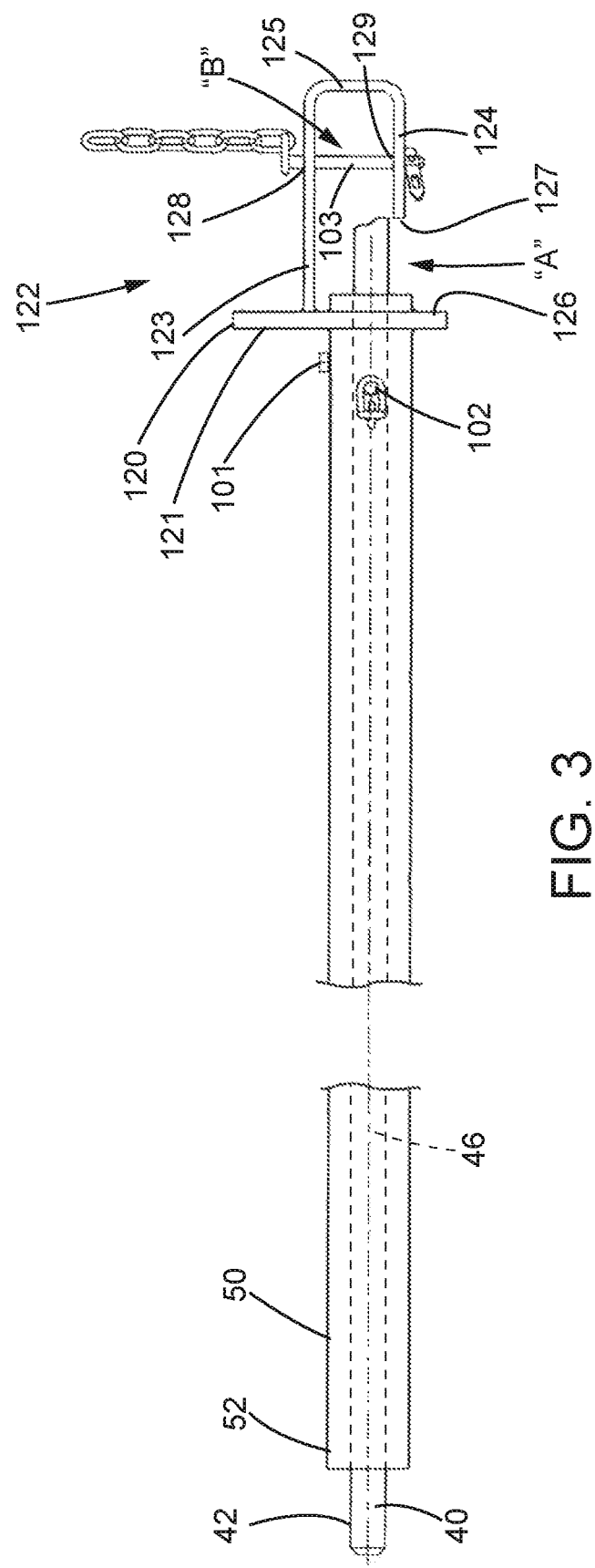
FIG. 3 is a side elevation view of a portion of the valve handle assembly with certain parts removed.

An extension shaft 40 extends from the valve handle 31 towards the bottom outlet valve 20. The extension shaft 40 may be configured as a generally rectangular shaft with a first end 41 and a second end 42. The first end 41 is dimensioned to fit within the rectangular bore 32 of valve handle 31. A cylindrical bore 43 extends through the first end 41 and is aligned with cylindrical bore 33 of valve handle 31 upon inserting the extension shaft into rectangular bore 32. Cylindrical bore 33 of valve handle 31 and cylindrical bore 43 of extension shaft 40 are each dimensioned to receive valve handle bolt 100 therein to facilitate securing the valve handle to the extension shaft 40. Extension shaft 40 further includes a cylindrical shaft guide bore 44 for receiving guide bolt 101 therein and a cylindrical locking bore 45 for receiving a shaft locking pin 102 (FIG. 3) therein. If desired, the extension shaft 40 may have a different cross section (e.g., circular) rather than the square cross section depicted. In such case, it may still be desirable for the first and second ends 41 and 42 to be formed with rectangular cross sections.

A support tube 50 in the form of an elongated cylindrical hollow tube or pipe is positioned between the valve handle 31 and the bottom outlet valve 20. The support tube 50 includes a first end 51 generally adjacent the valve handle 31 and a second end 52 opposite the first end. The support tube 50 is configured to permit extension shaft 40 to extend through and be rotatably mounted within the support tube. To that end, the support tube 50 includes an internal annular recess 59 (FIG. 5C) generally adjacent each of the first end 51 and the second end 52.

A shaft movement control slot 53 is positioned generally adjacent the first end 51 and interacts with the guide bolt 101 of extension shaft 40 to control movement of the extension shaft 40 and thus valve handle 31 as described in more detail below. The shaft movement control slot 53 has an axial section 54 (FIG. 5B) that extends generally parallel to the longitudinal axis of the support tube 50. The axial section 54 has a first end 54a and a second opposite end 54b. A circumferential section 55 extends from the second end 54b of axial section 54 closer to the second end 52 of the support tube along the circumference of the support tube 50.

The support tube 50 includes a pair of aligned cylindrical locking bores 56 for receiving the shaft locking pin 102 therein. A plurality of drain holes 57 (FIG. 5C) may be provided in a lower surface of the support tube 50 to provide drainage for water and other liquids that may enter the support tube.

The extension shaft 40 and the support tube 50 may be made of steel or any other desired material.

A shaft bushing 110 is positioned within each annular recess 59 of support tube 50 to engage and support the extension shaft 40 for rotation within the support tube. As depicted in FIG. 4, each shaft bushing 110 has a generally cylindrical outer surface 111 that engages one of the internal annular recesses 59 of support tube 50 and a generally rectangular inner bore 112 that engages the rectangular outer surface of extension shaft 40. The diameter of the outer surface 111 is slightly smaller than the diameter of the internal annular recesses 59 of support tube 50 to permit rotation of the bushing 110 therein. The inner bore 112 is dimensioned and configured to generally match the cross section of the extension shaft 40. Each bushing 110 may include a slot 113 extending between the outer surface 111 and the inner bore 112 to permit the bushing to be temporarily deformed by reducing its outer diameter to facilitate insertion of the bushing into the support tube 50. During assembly, once the bushing 110 is inserted into one of the internal annular recesses 59, the resilient nature of each bushing causes it to spring back to its original shape which facilitates retention of the bushing within its recess. In one embodiment, the shaft bushings 110 may be made of ultra high molecular weight polypropylene. Other materials and other types of bushings or other support members such as bearings may also be used.

As depicted in FIGS. 1 and 2, the support tube 50 may be mounted to the bottom portion 16 of the cylindrical tank 11 with brackets 115 and 120. Bracket 115 is depicted as a generally rectangular bracket mounted somewhat near the second end 52 of the support tube 50 and extending between the support tube and the bottom portion 16 of the cylindrical tank 11. Bracket 120 is depicted as a V-shaped bracket with a plate 121 mounted near the first end 51 of the support tube 50 and extends between the support tube and the bottom portion 16 of the cylindrical tank 11. The brackets 115 and 120 may be secured to the bottom portion 16 of the cylindrical tank 11 and the support tube 50 by welding or any other desired manner. Brackets of other shapes and configurations are contemplated and their configurations depend upon the configuration of the tank car 10.

V-shaped bracket 120 may include a U-shaped handle locking support 122 (FIG. 3) that extends from plate 121 outward or in a direction away from the bottom outlet valve 20. The handle locking support 122 has an upper leg 123 that extends from the plate 121, a lower leg 124 spaced from and generally parallel to the upper leg 123, and a bight or curved section 125 interconnecting the upper leg 123 and lower leg 124. The lower leg 124 is dimensioned to be spaced from an outer surface 126 of the plate 121 to form an opening or gap "A" between the outer surface 126 and an inner end 127 of the lower leg 124. An opening or gap "B" between the upper leg 123 and lower leg 124 is dimensioned to permit the valve handle 31 to slide therein towards and away from the bottom outlet valve 20 along a longitudinal or central axis 46 through the extension shaft 40. The opening or gap "A" permits the valve handle to pass between the outer surface 126 of the plate 121 and inner end 127 of the lower leg 124 as the valve handle 31 rotates about the axis 46. If desired, upper leg 123 may have an upper leg hole 128 and lower leg 124 may have a lower leg hole 129 aligned with hole 128. Holes 128 and 129 are configured to receive shaft locking pin 103 therein to secure the valve handle 31 between the upper leg 123 and lower leg 124 and prevent axial movement of the valve handle and extension shaft 40.

Adapter or coupling 60 is operative to selectively interconnect the bottom outlet valve 20 and the extension shaft 40. The adapter 60 includes a generally cylindrical body 61 with a first end 62 and a second end 63 opposite the first end. The first end 62 of adapter 60 includes a square bore or recess 64 dimensioned to slidingly receive the second end 42 of the extension shaft 40 therein. The square bore 64 may include a tapered lead-in section 65 to facilitate insertion of the second end 42 of the extension shaft 40 into the rectangular bore. A flange 66 may surround the lead-in section 65 to accommodate a larger chamfer in the lead-in section.

The second end 63 of the adapter 60 includes a bore or recess 67 (FIG. 5C) configured to slidingly receive the valve stem 26. As a result, the bore 67 includes a generally circular cross section with a pair of oppositely facing flat surfaces that match the pair of oppositely facing flat surfaces 28 of valve stem 26. The bore 67 is longer than the length of valve stem 26 so that the valve stem maintains contact with the bore as the adapter 60 slides relative to the bottom outlet valve 20. A stepped bore 70 extends between and connects the rectangular bore 64 with the bore 67 and is configured to receive connecting bolt 104 therein. A biasing member such as spring 105 is provided within bore 67 and interacts with an outer surface of valve stem 26 and the inner surface of bore 67 to bias the adapter 60 away from the valve body 21. A circular flange 71 is located adjacent the second end 63. Flange 71 has a generally rectangular radial notch 72 therein.

Adapter 60 may be formed of any suitable material. In one embodiment, the adapter 60 may be formed of cast iron with the general configuration made by casting and the details formed by subsequent machining. In another configuration, the adapter may be machined from round steel bar or stock.

Referring to FIGS. 2 and 4, a locking bracket 80 is provided that interacts with adapter 60 to operate as a valve rotation control structure that controls the rotation of the adapter and thus the opening and closing of the bottom outlet valve 20. Locking bracket 80 has an arcuate mounting section 81 with a plurality of spaced apart holes 82 through which fasteners such as bolts (not shown) used to secure the bottom outlet valve 20 to the tank car 10 may pass. A generally planar horizontal locking section 83 extends in a direction away from the flange 22 and has a notch 84 within which the circular flange 71 of adapter 60 may rotate. A vertical section 85 connects the mounting section 81 with the locking section 83. The length of vertical section 85 may be configured based upon the configuration of body 21 of bottom outlet valve 20. In other words, the location of the valve stem 26 relative to flange 22 may be based upon the manufacturer of the bottom outlet valve 20. As a result, the length of the vertical section 85 may be set based upon the distance of the valve stem 26 from the flange 22. The locking bracket 80 may be made of any desired material such as steel.

Adapter 60 is secured to bottom outlet valve 20 by connecting bolt 104 that extends through bore 67 in second end 63 of the adapter and into a threaded bore 29 in valve stem 26. Spring 105 biases the adapter 60 away from the bottom outlet valve 20.

Figure 6C:
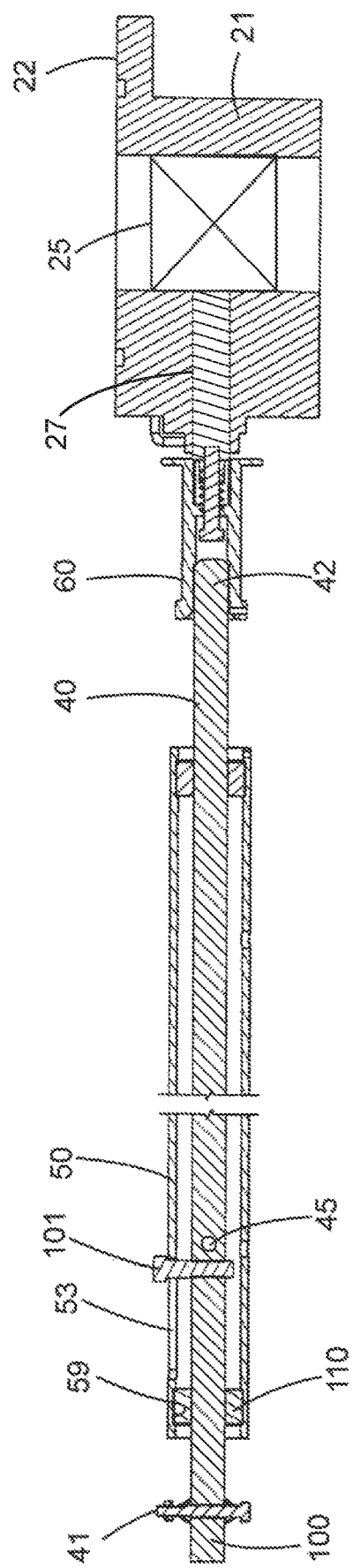
FIG. 6C is a sectional view of the bottom outlet valve and valve handle assembly of FIG. 6.
Figure 7C:
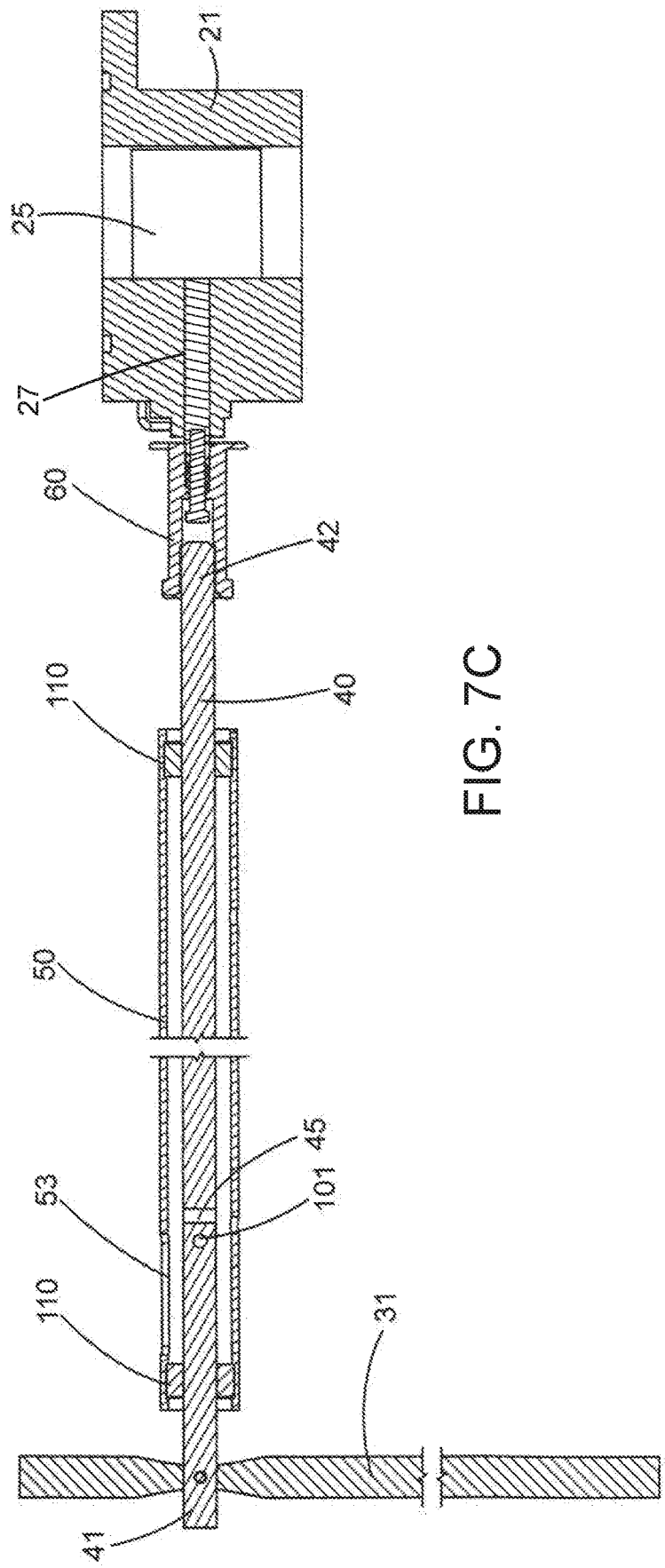
FIG. 7C is a sectional view of the bottom outlet valve and valve handle assembly of FIG. 7.

Adapter 60 is axially movable between a first operative locked position (valve closed) (FIGS. 5-5C) and a second operative rotatable position (valve closed) (FIGS. 6-6C) and is rotatably movable between the second operative rotatable position to a third operative rotatable position (valve open) (FIGS. 7-7C). At the first operative locked position, the second end 63 of the adapter 60 is spaced from the body 21 of the bottom outlet valve 20. In such position, spring 105 may be compressed by a first extent or amount or not compressed at all, if desired. The notch 72 of radial flange 71 engages the locking section 83 to prevent rotation of the valve stem 26 and thus prevents opening of the bottom outlet valve 20.

At the second operative rotatable position, adapter 60 has been slid axially towards body 21 of bottom outlet valve 20 so that radial flange 71 of the adapter is aligned with the notch 84 of locking bracket 80. In such position, spring 105 is compressed by a second extent or amount with the second extent being greater than the first extent of compression associated with the first operative position.

At the third operative rotatable position, adapter 60 has been rotated with the radial flange 71 of the adapter rotating within the notch 84 of locking bracket 80. Spring 105 remains compressed at the second extent or amount of compression. The interaction of the notch 84 with the radial flange 71 prevents the adapter 60 from disengaging from the valve stem 26 (i.e., sliding away from body 21) until the bottom outlet valve 20 is closed.

Operation of the bottom outlet valve 20 and the valve handle assembly 30 is described below in more detail with reference to FIGS. 5-7. Referring first to FIGS. 5-5C, the bottom outlet valve 20 is in its closed position and the valve handle assembly 30 and the adapter 60 are in their locked positions. More specifically, adapter 60 is biased away from the valve stem 26 by spring 105 which creates a gap "C" (FIG. 5C) between the second end 63 of the adapter and the body 21 of the bottom outlet valve 20. In such a configuration, the notch 72 of the flange 71 at the second end 63 of adapter 60 is aligned with and engages the locking section 83 of locking bracket 80. In other words, the locking section 83 of locking bracket 80 is positioned within the notch 72 of flange 71 and the interference between the two components prevents the rotation of adapter 60. Since the bore 67 at the second end 63 of adapter 60 engages the valve stem 26, the interaction between the adapter 60 and the locking bracket 80 prevents rotation of the valve stem and thus maintains the bottom outlet valve 20 in its locked position.

Valve handle 31 and extension shaft 40 are positioned with the valve handle in a horizontal position and the extension shaft 40 positioned in its outer position relative to the support tube 50. Rotation of extension shaft 40 is prevented by the engagement of guide bolt 101 with the axial section 54 of shaft movement control slot 53 of support tube 50. Rotation of extension shaft 40 is further prevented by the engagement between valve handle 31 and lower leg 124 of handle locking support 122.

The outer limit of the axial movement of the extension shaft 40 relative to the support tube 50 is defined by the interaction between guide bolt 101 and the first or outer end 54a of axial section 54 of shaft movement control slot 53 of support tube 50. As may be seen in FIGS. 5A and 5C, the second end 42 of extension shaft 40 is spaced from the first end 62 of adapter 60.

If desired, during transportation of the tank car, shaft locking pin 102 may be inserted through locking bore 45 of extension shaft 40 and the locking bores 56 of support tube 50. In addition, locking pin 103 may also be positioned through hole 128 in the upper leg 123 and hole 129 in lower leg 124 of handle locking support 122 so that the pin acts as an obstacle to prevent axial movement of the valve handle 31 and the extension shaft 40 along axis 46 and towards the bottom outlet valve 20.

Upon removing locking pins 102 and 103, the valve handle 31 and extension shaft 40 may be slid or moved along axis 46 towards the bottom outlet valve 20 as depicted in FIGS. 6-6C. Upon doing so, the valve handle 31 moves inwardly within the opening "B" (FIG. 3) between the upper leg 123 and the lower leg 124 of the handle locking support 122 until the valve handle has moved far enough that the lower leg no longer blocks rotational movement of the valve handle. As the extension shaft 40 moves towards the bottom outlet valve 20, the guide bolt 101 moves within the axial section 54 of the shaft movement control slot 53 from the first end 54a of the axial section to the second end 54b. Engagement of the bolt 101 with the second end 54b of axial section 54 of slot 53 prevents further inward movement of the extension shaft 40.

As may be best seen by comparing FIGS. 5C and 6C, inward movement of extension shaft 40 within support tube 50 towards bottom outlet valve 20 further results in the second end 42 of the extension shaft entering the rectangular bore 64 at the first end 62 of adapter 60. The length of the axial section 54 of slot 53 is greater than the depth of the bore 64 so that continued movement of extension shaft 40 (subsequent to the second end 42 of extension shaft 40 engaging the bottom of the bore 64 of adapter 60) results in movement of adapter 60 along axis 46 towards the bottom outlet valve 20. The axial movement of the adapter 60 towards the bottom outlet valve 20 results in compression of spring 105 and movement of the notch 72 of flange 71 of the adapter 60 towards the bottom outlet valve until the flange 71 is aligned with and positioned within the notch 84 of the locking section 83 of locking bracket 80. As a result of the alignment of the flange 71 of adapter 60 with the notch 84 of locking bracket 80, the adapter 60 is able to rotate without interference from the locking bracket 80. In addition, guide bolt 101 is aligned with the circumferential section 55 of shaft movement control slot 53 so that the valve handle 31 and extension shaft 40 may rotate relative to the support tube 50.

Clockwise rotation of the valve handles 31 and extension shaft 40 from the position depicted in FIG. 6 to that depicted in FIG. 7 results in opening of the bottom outlet valve 20. Upon doing so, the valve handle 31 and the extension shaft 40 have been rotated 90° clockwise along axis 46. The guide bolt 101 is at the end 55a of circumferential section 55 opposite the axial section 54 to define the limits of rotation of the valve handle 31 and extension shaft 40. The rotation of the adapter 60 is evident from the position of the notch 72 in the flange 71 adjacent the bottom outlet valve 20 as best seen in FIG. 7B.

To close the bottom outlet valve 20, the sequence depicted in FIGS. 5-7 is essentially reversed. The handle 31 and extension shaft 40 are rotated counterclockwise until the guide bole 101 is aligned with axial section 54 of shaft movement control slot 53 and notch 72 of flange 71 of adapter 60 is aligned with and positioned within the notch 84 of the locking section 83 of the locking bracket 80. Such rotation causes the closure of the bottom outlet valve 20.

The handle 31 and extension shaft 40 are slid axially away from the bottom outlet valve 20 and the biasing member or spring 105 moves adapter 60 axially away from the body 21 of the valve. The guide bolt 101 slides within the axial section 54 of shaft movement control slot 53 and the notch 72 of flange 71 slides along the locking section 83. The handle 31 may be positioned within the U-shaped handle locking support 122, locking pin 102 inserted into hole 45 in extension shaft 40 and holes 56 in support tube 50, and locking pin 103 inserted into the holes 128, 129 to prevent unintentional movement of the handle 31 and extension shaft 40 towards the adapter 60.

Due to the configuration and position of the shaft movement control slot 53, the valve handle 31 and extension shaft 40 may only move linearly along axis 46 (i.e., may not rotate) until the valve handle and extension shaft have been moved sufficiently towards the bottom outlet valve 20 so that the locking pin 101 is aligned with the circumferential section 55 of shaft movement control slot 53. In addition, the engagement of the notch 72 of flange 71 of adapter 60 with the locking bracket 80 also prevents rotation of the adapter 60 (and thus the opening of the bottom outlet valve 20) until the extension shaft 40 has moved sufficiently along axis 46 so that the flange 71 is aligned with the notch 84 in the locking bracket. As a result, the interaction of guide bolt 101 on extension shaft 40 with shaft movement control slot 53 of support tube 50 defines a first valve rotation control structure and the interaction of notch 72 of flange 71 of adapter 60 with the locking bracket 80 defines a second valve rotation control structure that reduce or eliminate the risk of inadvertent opening of the bottom outlet valve 20.

In addition, the present configuration also prevents the valve handle 31 and extension shaft 40 from moving back to their closed positions as depicted in FIGS. 2 and 5 while the bottom outlet valve 20 is open. More specifically, engagement of guide bolt 101 with the circumferential section 55 of shaft movement control slot 53 and flange 71 with notch 84 in locking section 83 prevents axial movement of the valve handle 31, extension shaft 40, and adapter 60 away from the bottom outlet valve 20 along axis 46 until the valve handle and extension shaft (and thus adapter 60) are rotated back to their closed positions. The structure ensures that valve handle 31 and extension shaft 40 may only be moved back to their locked positions when the bottom outlet valve 20 is closed.

Figure 8:
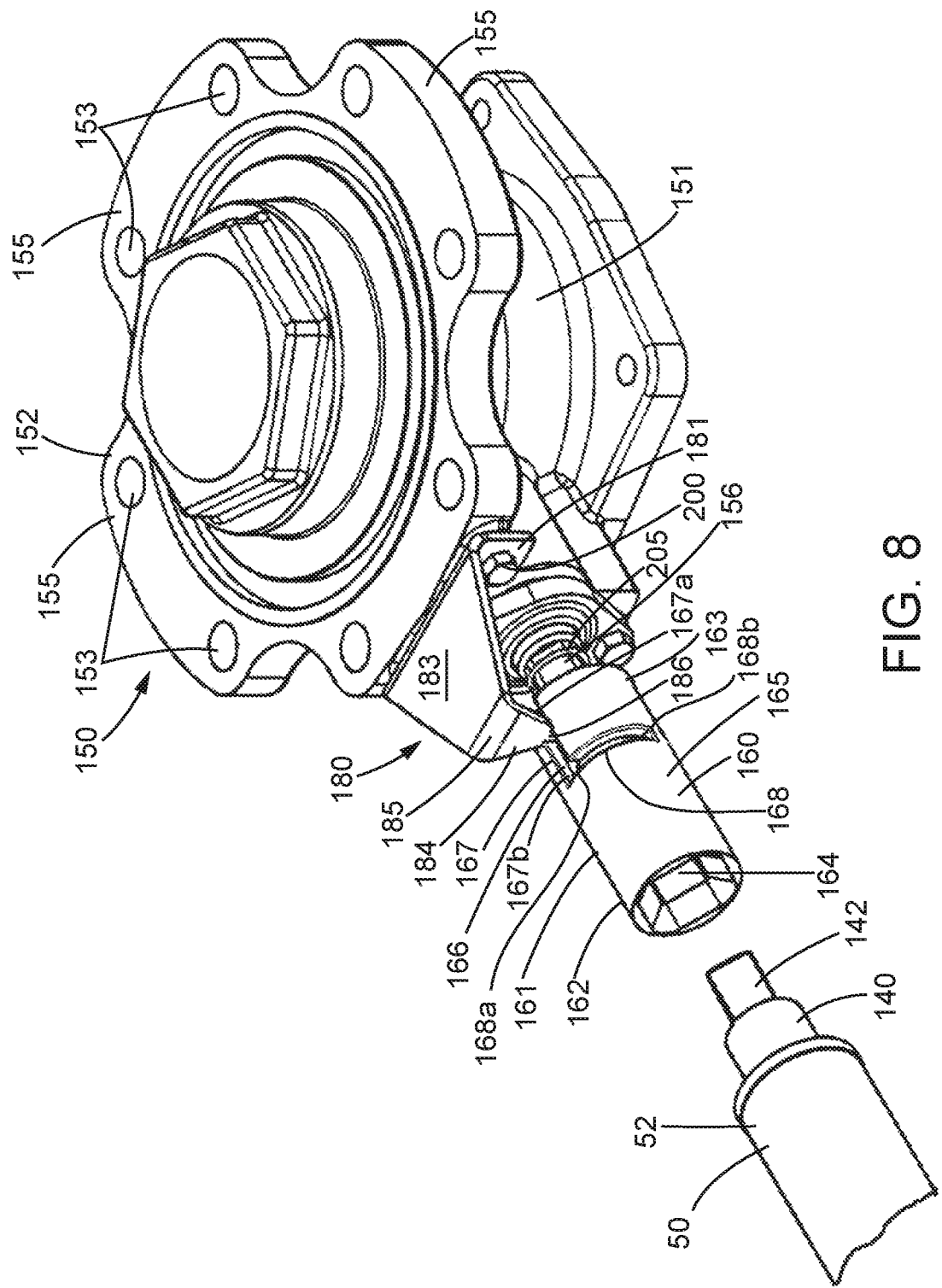
FIG. 8 is an enlarged perspective view of a second embodiment of a bottom outlet valve and portion of a valve handle assembly at a locked position and with the valve closed.
Figure 9:
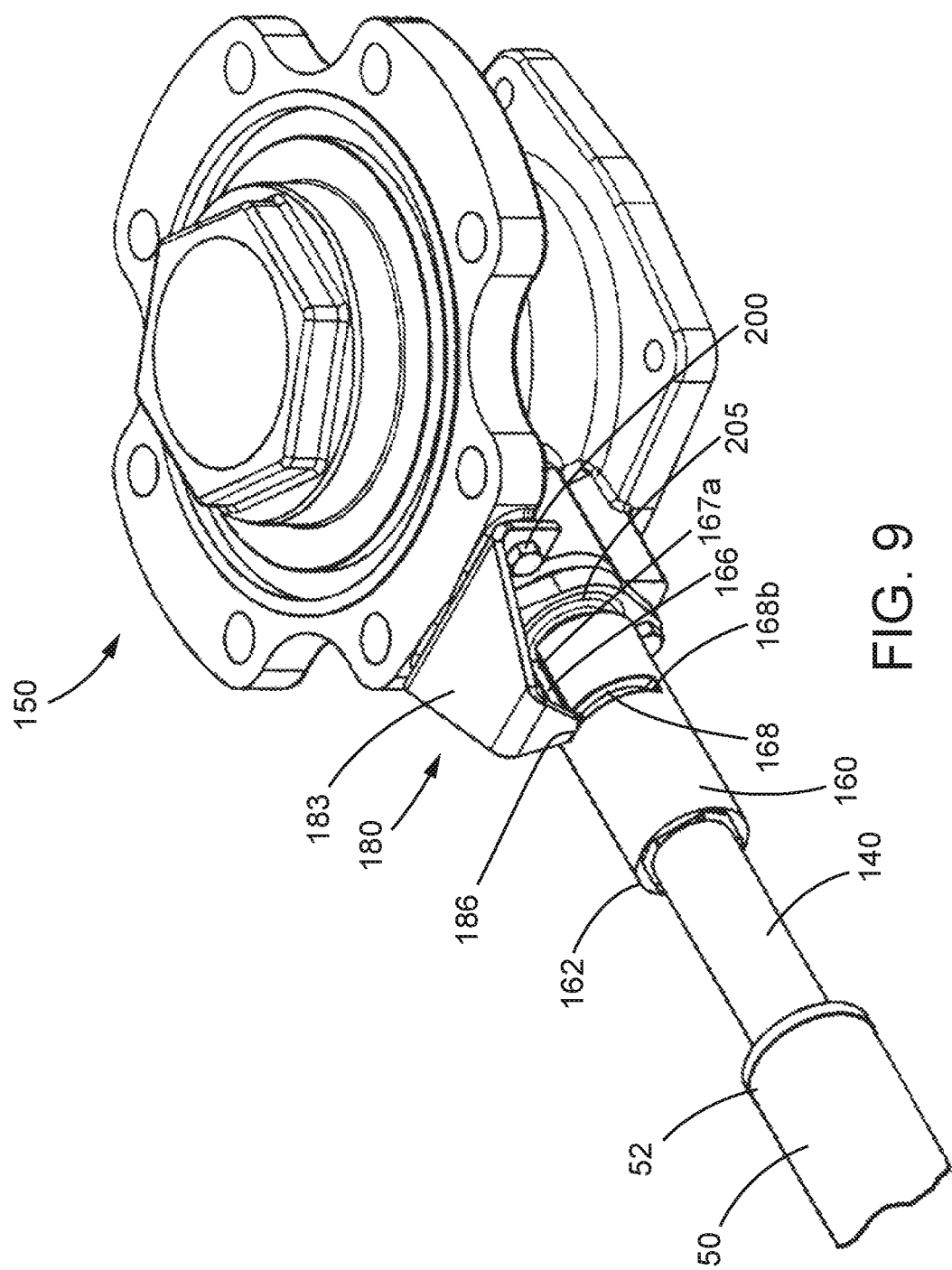
FIG. 9 is an enlarged perspective view similar to FIG. 8 but with the bottom outlet valve and valve handle assembly at a rotatable position and with the valve closed.
Figure 10:
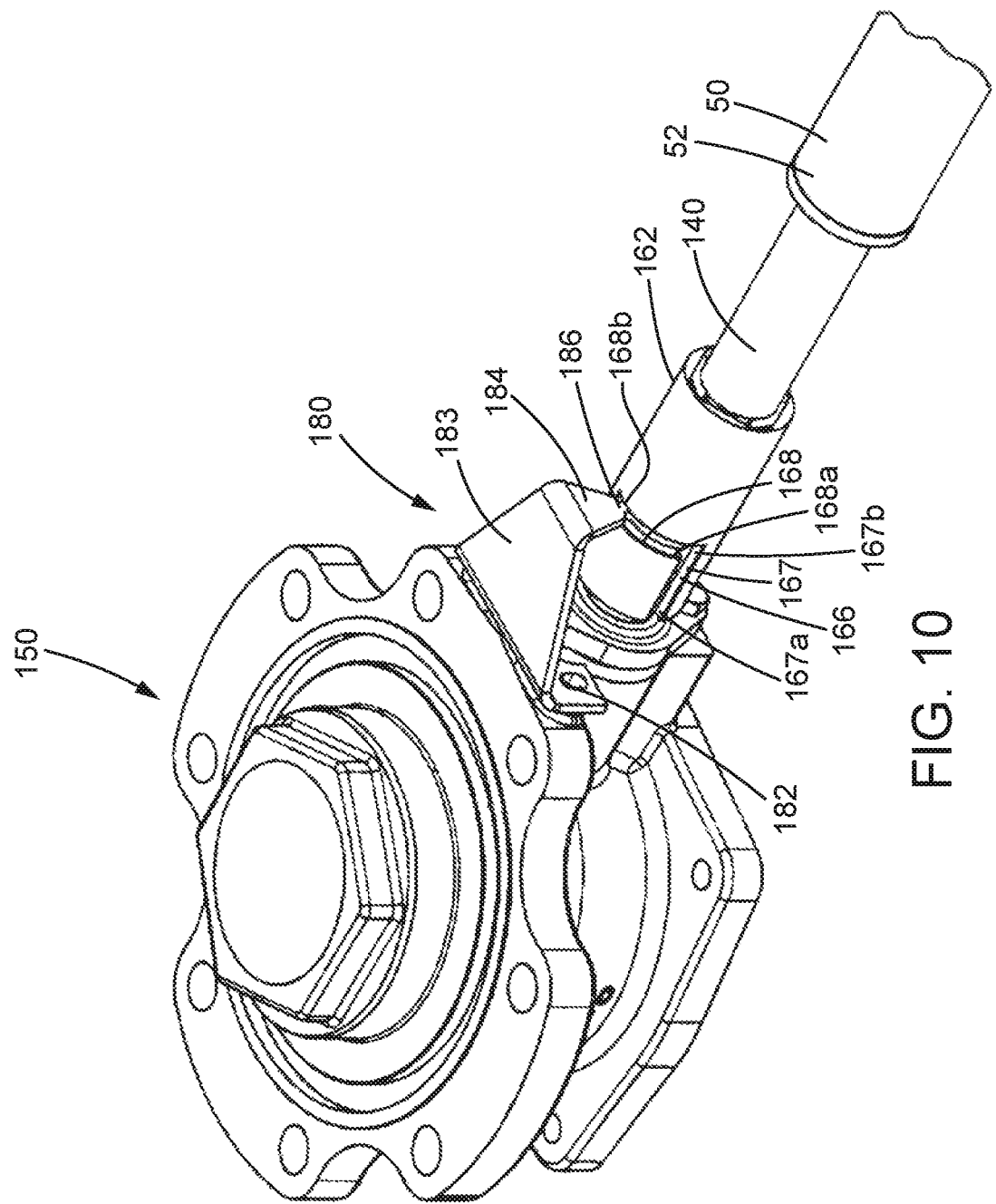
FIG. 10 is an enlarged perspective view similar to FIG. 9 but from a different perspective and with the bottom outlet valve and valve handle assembly at a rotatable position and with the valve open.

FIGS. 8-10 depict an alternate embodiment of an adapter 160 and a locking bracket 180. Like reference numbers are used to describe like components with respect to FIGS. 2-7 described above. Extension shaft 140 and bottom outlet valve 150 are substantially identical to those described above except with respect to certain aspects described herein and/or depicted in the drawings. For example, extension shaft 140 has a generally circular cross section and first and second end sections (only the second of which is visible at 142) with square cross sections. In addition, as described below, the handle 31 and extension shaft 140 are rotated in a counter-clockwise direction to open bottom outlet valve 150 as compared to the clockwise rotation to open bottom outlet valve 20. Accordingly, the circumferential section (not shown) of the shaft movement control slot of the support tube of FIGS. 8-10 extends in a direction opposite that depicted in FIGS. 2-7 to permit such opposite rotation.

Bottom outlet valve 150 has a flange 152 with four spaced apart lobes 155. Each lobe has a pair of pair of spaced apart holes 153 through which fasteners such as bolts (not shown) may pass to secure the bottom outlet valve 150 to the tank car 10. Holes 153 may be configured in the same pattern as holes 23 of bottom outlet valve 20 and correspond to a standard hole pattern on tank cars 10.

Adapter or coupling 160 has a generally cylindrical body 161 with a first end 162 and a second end 163 opposite the first end. Bore 164 at the first end 162 of adapter 160 is generally square and configured to slidably receive and engage the second end 142 of extension shaft 140. The bore (not shown) in the second end 163 of adapter 160 is configured to slidingly engage the valve stem 156 of bottom outlet valve 150 as described above with respect to FIGS. 2-7.

It should be noted that the orientation of second end section 142 of extension shaft 140 and bore 164 of adapter 160 are rotated 45° relative to the second end 42 of extension shaft 40 and bore 67 of adapter 60 depicted in FIGS. 2-7 when the bottom outlet valve 150 is closed. If desired, the orientations of second end section 142 of extension shaft 140 and bore 164 of adapter 160 could be similar to those depicted in FIGS. 2-7 or be configured in any other desired orientation provided that the second end section 142 and bore 164 are aligned.

The outer cylindrical surface 165 of adapter 160 has an adapter movement control slot 166 that is positioned generally adjacent the second end 163 and interacts with the locking bracket 180 to control movement of the adapter and thus the valve stem 26 as described in more detail below. The adapter movement control slot 166 has an axial section 167 and a circumferential section 168. The axial section 167 extends generally parallel to the central axis of the adapter 160 and has a first end 167a that intersects with the second end 163 of adapter 160 and a second end 167b opposite the first end of the slot 166. The circumferential section 168 extends from the second end 167b of the axial section 167 into the surface 165 of the adapter 160. The circumferential section 168 has a first end 168a that begins at the second end 167b of the axial section 167 and a second end 168b spaced from the first end.

A biasing member depicted as relatively large compression spring 205 is positioned between the second end 163 of adapter 160 and valve body 151 to bias the adapter away from the bottom outlet valve 150. If desired, a recess (not shown) may be provided in the face of the adapter 160 at the second end 163 to assist in positioning and retaining the spring 205. It should be noted that the spring 205 has a diameter substantially larger than spring 105 depicted in the embodiment of FIGS. 2-7. The size and configuration of the biasing member may be chosen based upon the desired performance characteristics and the configuration of the adapter 60, 160 and bottom outlet valve 150, as desired.

Locking bracket 180 has a mounting section 181 with spaced apart holes 182 (FIG. 10) through which fasteners such as bolts 200 may be inserted to secure the locking bracket to a vertical face of the flange 152 of the bottom outlet valve 150. A generally horizontal extension section 183 extends outward from the mounting section 181. A vertical locking section 184 extends downward from the outer end 185 of the extension section 183. A slot engaging tab or locking projection 186 extends downward from the locking section 184 and is configured to slidingly engage the adapter movement control slot 166 to operate as a valve rotation control structure that controls the axial and rotational movement of adapter 160 and thus the bottom outlet valve 150.

The operation of the embodiment depicted in FIGS. 8-10 is substantially identical to that described above with respect to FIGS. 2-7. Accordingly, only the interaction of the extension shaft 140, the adapter 160 and the locking bracket 180 are described relative to their operation. As depicted in FIG. 8, the second end 142 of extension shaft 140 is spaced from the first end 162 of adapter 160 while the valve handle 31, the extension shaft 140, and the adapter 160 are in their locked position and the bottom outlet valve 150 is in its closed position. The adapter 160 is spaced from the body 151 of the bottom outlet valve 150 by the biasing force of spring 205 and the locking projection 186 is within the axial section 167 of adapter movement control slot 166 between the first end 167a and the second end 167b of the axial section. The engagement of the locking projection 186 with the axial section 167 of slot 166 prevents the adapter 160 from rotating and the engagement of the bore (not shown) in the second end 163 of adapter 160 with the valve stem 156 prevents the rotation of the valve stem and the opening of bottom outlet valve 150.

Upon sliding the valve handle 31 and extension shaft 140 axially inward towards the bottom outlet valve 150 as depicted in FIG. 9, the extension shaft slides through support tube 50 and the second end 142 of the extension shaft slides into the bore 164 at the first end 162 of the adapter 160. Continued axial movement of the valve handle 31 and the extension shaft 140 towards the bottom outlet valve 150 causes the adapter 160 to slide axially towards the bottom outlet valve so that the locking projection 186 of the locking bracket 180 slides through the axial section 167 of slot 166 until reaching the second end 167b of the axial section. During such sliding movement, the valve stem 156 slides within the bore in the second end 163 of adapter 160 in a manner similar to that described above with respect to FIGS. 2-7.

Upon reaching the second end 167b of the axial section, the locking projection 186 is aligned with the circumferential section 168 of adapter 160 and the adapter (and thus the valve stem 156 engaged thereby) are able to rotate counter-clockwise without interference from the projection. Extension shaft 140, shaft movement control slot 53, guide bolt 101, adapter 160, adapter movement control slot 166, and locking projection 186 are all configured so that guide bolt 101 is aligned with circumferential section 55 of the shaft movement control slot 53 when the locking projection 186 is aligned with the circumferential section 168 of adapter movement control slot 166. As a result, counter-clockwise rotation of the valve handle 31, extension shaft 140, adapter 160 and valve stem 156 are only possible in the fully aligned position.

FIG. 10 depicts the adapter 160 rotated counter-clockwise to its fully open position which also opens the valve stem 156 and the bottom outlet valve 150. Locking projection 186 is at the second end 168b of the circumferential section 168 of the adapter movement control slot 166.

Closing the bottom outlet valve 150 with the adapter 160 and the locking bracket 180 of FIGS. 8-10 is substantially identical to that described above with respect to FIGS. 2-7 except that the rotation is clockwise rather than counter-clockwise. More specifically, since the guide bolt 101 is positioned within the circumferential section 55 of the shaft movement control slot 53 and the locking projection 186 of locking bracket 180 is positioned within the circumferential section 168 of the adapter movement control slot 166, neither the valve handle 31, the extension shaft 140, nor the adapter 160 may move axially until the extension shaft 140 and the adapter 160 are rotated clockwise so that the guide bolt 101 is aligned with the axial section 54 of slot 53 and the locking projection 186 is aligned with the axial section 167 of slot 166.

Upon such alignment, the valve handle 31 and the extension shaft 140 may slide along axis 46 outwardly or away from bottom outlet valve 150 with the guide bolt 101 sliding within the axial section 54 of slot 53. As the extension shaft 140 slides axially away from the bottom outlet valve 150 and the adapter 160, the biasing force from spring 205 causes adapter 160 to slide axially away from the bottom outlet valve. In doing so, locking projection 186 slides within axial section 167 of slot 166 and locks the adapter 160 and thus valve stem 156 and the bottom outlet valve 150 in their closed positions.

Still another alternate embodiment of a valve handle assembly is depicted generally as 220 in FIGS. 11-17. Bottom outlet valve 150 is generally identical to the bottom outlet valve depicted in FIGS. 8-10 and the description thereof is not repeated herein. Like reference numbers are used to designate like components. Bottom outlet valve 150 includes a valve stem 156 (FIG. 12) operatively connected to the valve mechanism within the bottom outlet valve to facilitate opening and closing of the valve. The valve stem 156 of bottom outlet valve 150 has a pair of oppositely facing flat surfaces 157 and a locking bore 158 extends through the valve stem between the flat surfaces 157.

Figure 11:
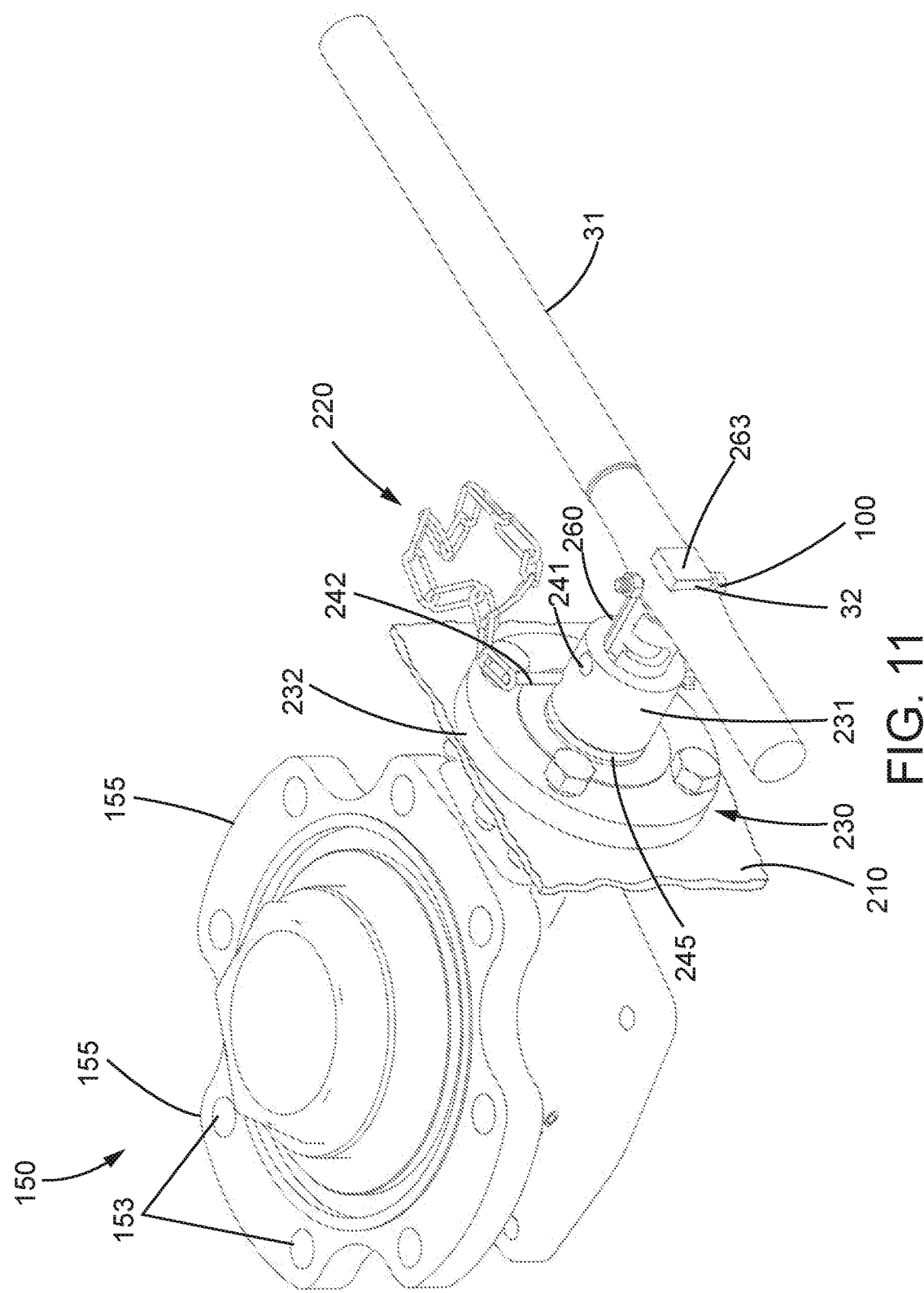
FIG. 11 is a perspective view of a third embodiment of a bottom outlet valve and a valve handle assembly at a locked position and with the valve closed.
Figure 12:
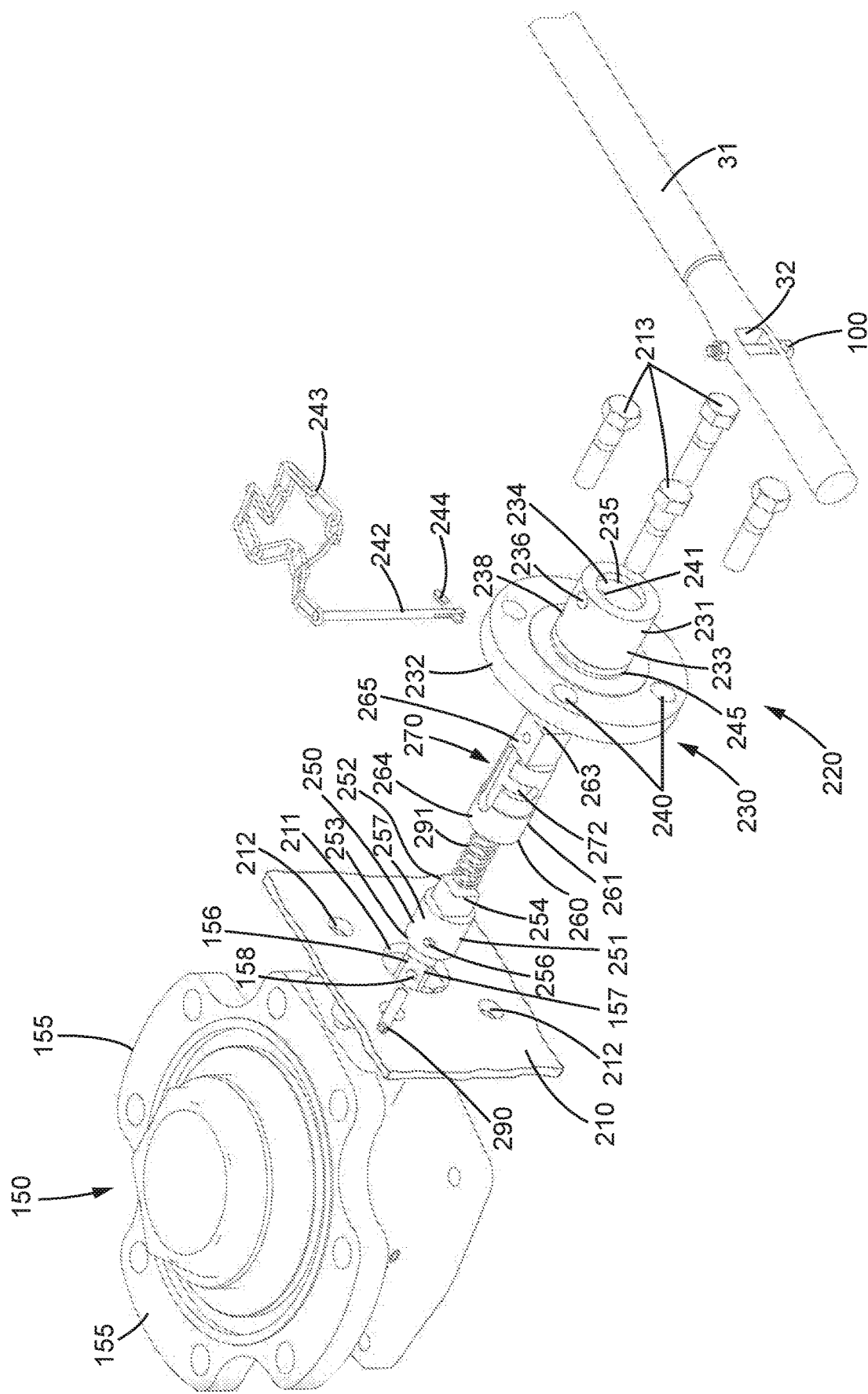
FIG. 12 is an exploded perspective view of the valve handle assembly together with the bottom outlet valve of FIG. 11.
Figure 13:
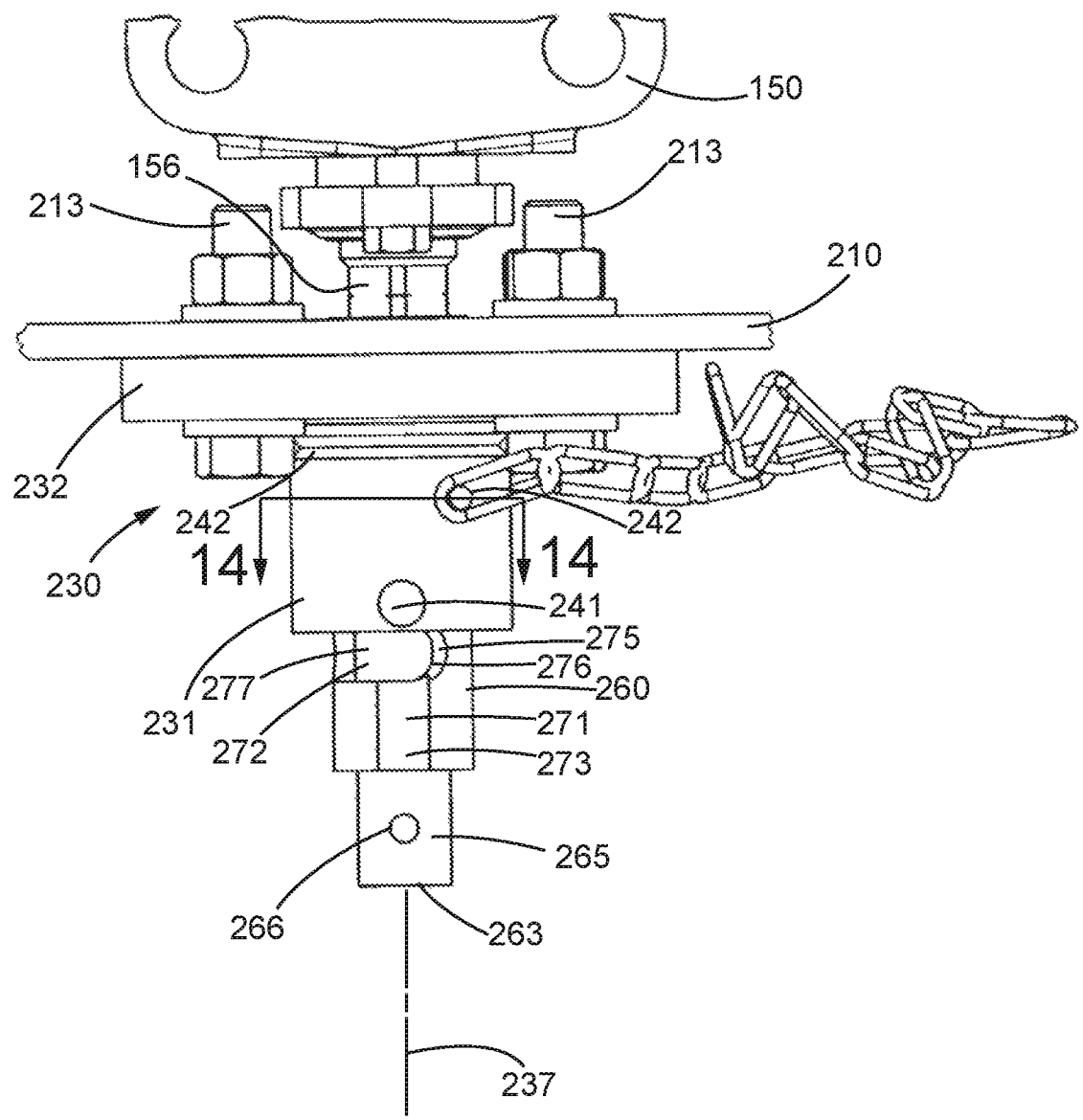
FIG. 13 is an enlarged top plan view of a portion of the bottom outlet valve and the valve handle assembly with the handle removed.

A portion of a sidewall 210 of the skid plate or skirt 17 of FIG. 1 is depicted in FIGS. 11-12. The sidewall 210 has a central bore 211 and a plurality of mounting bores 212 surrounding the central bore 211. Sidewall 210 is configured for mounting and supporting the valve handle assembly 220 thereon. By mounting the valve handle assembly 220 to sidewall 210, modifications to the tank car 10 may be limited to the skirt 17 and thus may reduce the complexity and time required to mount the valve handle assembly to the tank car 10.

In addition, the embodiment of FIGS. 11-17 does not require brackets 115 and 120 to be mounted to the tank car 17. Thus, in some situations, the valve handle assembly 220 may simplify the installation process as compared to the valve handle assembly 30. In other situations, such as when retro-fitting a tank car that has been used with petroleum or other chemical products, it may be problematic or cost prohibitive to weld components onto the tank car. Since the valve handle assembly 220 may be mounted using bolts rather than welding, the valve handle assembly of FIGS. 11-17 may be particularly useful for retro-fit applications.

Valve handle assembly 220 includes a support member 230, an adapter 250, a travel control shaft 260, and a handle 31. Support member 230 includes a generally elongated cylindrical hollow tube or pipe 231 with a bolt flange 232. Cylindrical tube 231 has an outer cylindrical surface 233, a central bore 234, and an inner surface 235. Although outer surface 233 is cylindrical, it may have any desired shape. A guide bore 236 extends through one side of the cylindrical tube 231 between the outer surface 233 and the inner surface 235 and intersects with a central axis 237 of the cylindrical tube 231.

Figure 14:
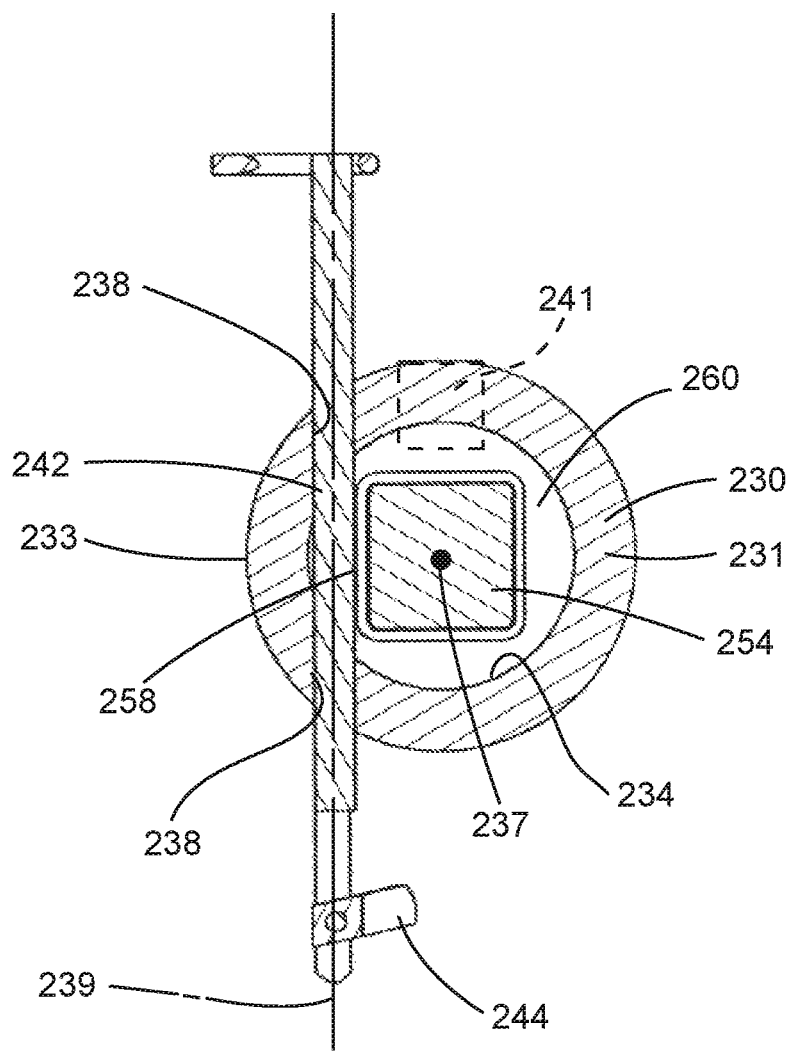
FIG. 14 is a section taken generally along line 14-14 in FIG. 13.
Figure 15:
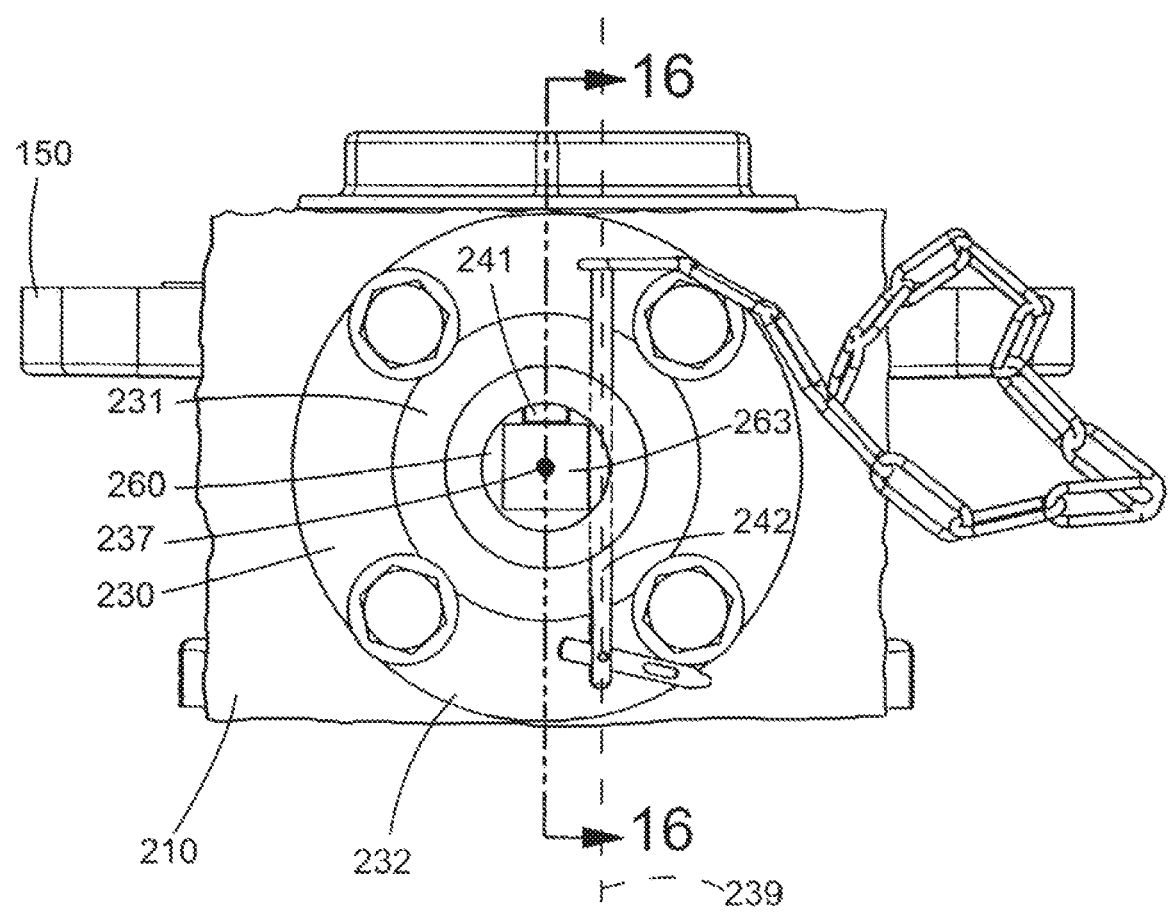
FIG. 15 is an end view of the bottom outlet valve and the valve handle assembly with the handle removed.
Figure 16:
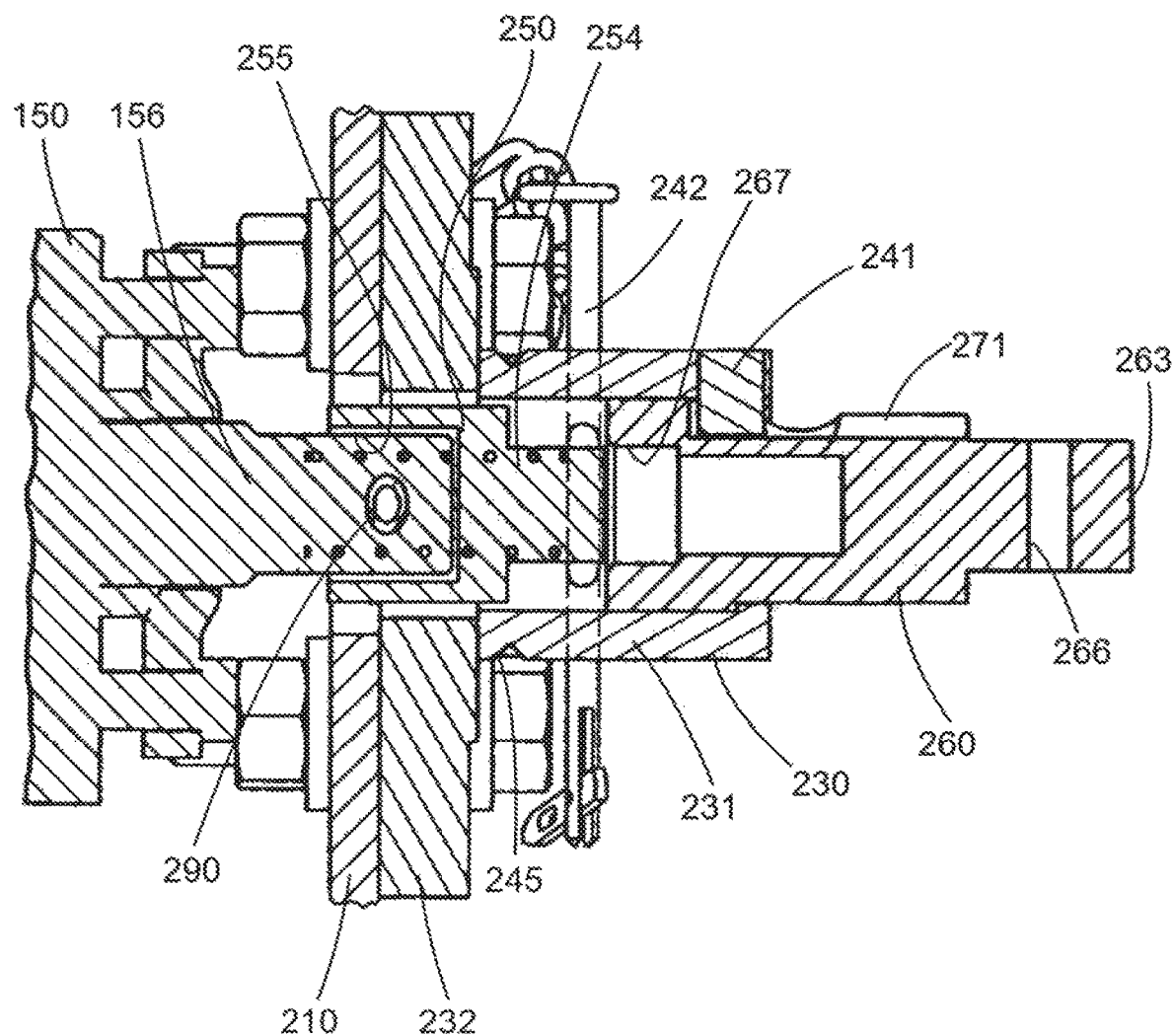
FIG. 16 is a section taken generally along line 16-16 in FIG. 15

A pair of locking bores 238 extend through the cylindrical tube 231 at positions offset from the axis 237 of the cylindrical tube. As best seen in FIGS. 14-15, the locking bores 238 extend through the outer surface 233 of cylindrical tube 231 at two locations with an axis 239 extending through the locking bores being offset from axis 237 of the cylindrical tube.

The flange 232 has a plurality of mounting bores 240 configured in the same pattern as the mounting bores 212 of sidewall 210 of skid plate 17 of tank car 10. In some embodiments, a V-groove 245 may be provided in the cylindrical tube 231 near the flange 232. The V-groove 245 acts as an area of reduced strength or stress concentration so that in case of an accident, the support member 230 may break at the V-groove to release the travel control shaft and render the valve handle assembly 220 inoperable and prevent inadvertent opening of the bottom outlet valve 150.

Support member 230 may be formed of any suitable material. In one embodiment, cylindrical tube 231 may be a steel tube or pipe and the flange 232 formed separately and joined to the cylindrical tube by utilizing complementary configured threads, by welding, or any other desired technique. In another embodiment, the cylindrical tube 231 and flange 232 may be formed of a one-piece, unitary member.

A guide pin 241 is permanently fixed in guide bore 236 and extends past the inner surface 235 and into the central bore 234 of the cylindrical tube 231. The guide pin 241 may be welded or press fit into the guide bore 236, may be threaded into guide bore 236, or permanently mounted therein in any other desired manner.

A locking pin 242 is configured to be removably inserted into the locking bores 238 to extend across a portion of the central bore 234 of the cylindrical tube 231. The locking pin 242 may include a chain 243 to secure the locking pin to the tank car 10 and may include a locking mechanism 244 to secure the locking pin within the locking bore 238.

Support member 230 may be mounted to the sidewall 210 with bolts 213 that extend through mounting bores 212 of sidewall 210 and mounting bores 240 that extend through flange 232. Other manners of mounting support member 230 to the sidewall 210 are contemplated.

Adapter or coupling 250 has a generally cylindrical body 251 with a first end 252 and a second end 253 opposite the first end. The first end 252 has an engagement section 254 with a generally rectangular cross-section. The second end 253 has a bore or recess 255 (FIG. 16) corresponding in cross-section to that of the valve stem 156 of bottom outlet valve 150 so that the valve stem may be slidingly received therein. Thus, the bore 255 includes a generally circular cross-section with a pair of oppositely facing flat surfaces that match the pair of oppositely facing flat surfaces 157 of the valve stem 156. The adapter 250 includes a locking bore 256 that extends through the outer surface 257 and intersects with the bore 255 adjacent the second end 253 of the adapter. Upon mounting the adapter 250 on the valve stem 156, the locking bore 256 of the adapter and the locking bore 158 of the valve stem 156 are aligned to permit a locking pin 290 to be press-fit through the bores 158, 256 to secure the adapter to the valve stem.

Adapter 250 may be formed of any suitable material. In one embodiment, the adapter 250 may be formed of cast iron with the general configuration formed by the casting and details formed by subsequent machining. In another configuration, the adapter 250 may be machined from round steel bar or stock.

Travel control shaft 260 includes a generally cylindrical body 261 with an outer surface 262 and has a first end 263 and a second end 264 opposite the first end. The first end 263 has a handle engagement section 265 with a generally square cross-section and a cylindrical bore 266 extending therethrough. The second end 264 has a square bore or recess 267 (FIG. 16) dimensioned to slidingly receive the engagement section 254 at the first end 252 of adapter 250 therein.

Figure 17:
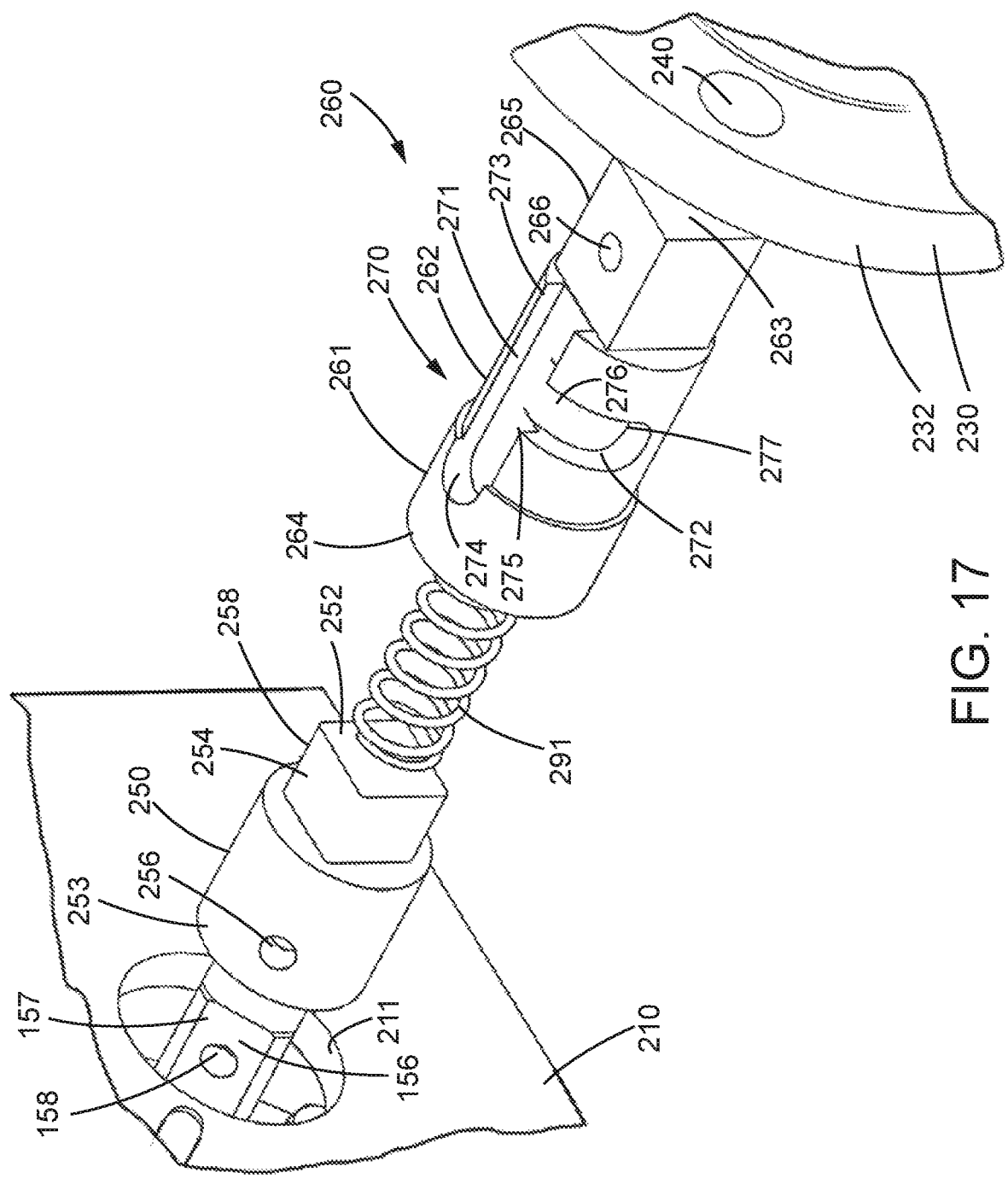
FIG. 17 is an enlarged view of a portion of FIG. 12.

The outer surface 262 of travel control shaft 260 has a movement control slot 270 that receives and interacts with the guide pin 241 of support member 230 to operate as a valve rotation control structure that controls movement of the valve stem 156 (and thus bottom outlet valve 150) as described in more detail below. Referring to FIG. 17, the movement control slot 270 has an axial section 271 and a circumferential section 272. The axial section 271 extends generally parallel to the central axis of the travel control shaft 260 and has a first end 273 that begins at the handle engagement section 265 and a second end 274 generally adjacent, but spaced from, the second end 264 of the travel control shaft. The circumferential section 272 extends from an intersection or location 275 generally midway between the first end 273 and the second end 274 of the axial section 271 along the outer surface 262 of the travel control shaft 260. The circumferential section 272 has a first end 276 that begins at the intersection 275 of the axial section 271 and a second end 277 opposite the first end. The axial section 271 and the circumferential section 272 are dimensioned to slidingly receive a portion of guide pin 241 therein.

The travel control shaft 260 may be formed of any suitable material. In one embodiment, the travel control shaft 260 may be formed of cast-iron with the general configuration formed by casting and the details formed by subsequent machining. In another configuration, the travel control shaft 260 may be machined from round steel bar or stock.

Valve handle 31 is generally identical to that described above with respect to FIGS. 2-7 and the description thereof is not included herein. Like reference numbers are used to designate like components. Square bore 32 is dimensioned to slidingly receive the handle engagement section 265 at the first end 263 of the travel control shaft 260.

During assembly, guide pin 241 is initially inserted into and secured within the guide bore 236 of cylindrical tube 231. Adapter 250 is slid onto the valve stem 156 and the bore 158 of the valve stem and bore 255 of the adapter aligned. Locking pin 290 is press-fit through the aligned bores 158, 255 to secure the adapter 250 to the valve stem 156. A biasing member such as compression spring 291 is positioned between and aligned with the first end 252 of adapter 250 and the bore 267 at the second end 264 of the travel control shaft 260 and the travel control shaft 260 is slid onto the adapter 250.

Guide pin 241 is aligned with axial section 271 and the support member 230 is slid onto the travel control shaft 260. Guide pin 241 extends into inner bore 234 of support member 230 a sufficient distance (and the travel control shaft 260 is dimensioned) to permit the guide pin (when secured within guide bore 236) to slide past the handle engagement section 265 during assembly and still operatively engage the movement control slot 270 during operation of the valve handle assembly 220.

Mounting bores 240 of flange 232 are aligned with mounting bores 212 of sidewall 210 and bolts 213 are inserted through the aligned bores to secure the flange 232 to the sidewall 210. Once the flange 232, and thus support member 230, is mounted to sidewall 210, the handle engagement section 265 at first end 263 of the travel control shaft 260 extends out from the central bore 234 of the cylindrical tube 231 of support member 230. The square bore 32 of valve handle 31 is aligned with and mounted on the handle engagement section 265 of the first end 263 of the travel control shaft 260 with the bore 33 of the valve handle 31 aligned with the bore 266 of the handle engagement section. Valve handle 31 is secured to the travel control shaft 260 by inserting valve handle bolt 100 through the bore 33 of the valve handle and bore 266 of the travel control shaft.

When the bottom outlet valve 150 is closed and the valve handle assembly 220 is locked as depicted in the drawings, the guide pin 241 is positioned generally adjacent the second end 274 of the axial section 271 of the movement control slot 270 and rotation of the valve handle 31 and travel control shaft 260 is prevented by the engagement of sidewalls of the axial slot with the guide pin. In other words, since the guide pin 241 is not aligned with the circumferential section 272, rotation of the handle 31 and travel control shaft 260 is prevented.

Referring to FIG. 14, the engagement section 254 of the first end 252 of adapter 250 is aligned with the locking bores 238 of support member 230 so that the axis 239 through the locking bores is adjacent one sidewall 258 of the engagement section. By inserting locking pin 242 through the locking bores 238, a portion of the locking pin extends across the sidewall 258 of the engagement section 254. Since the adapter 250 is fixed to the valve stem 156, the locking pin 242 prevents rotation of both the adapter and the valve stem.

Still further, the locking pin 242 prevents axial movement of travel control shaft 260 towards adapter 250. As a result, the travel control shaft 260 may not operatively engaging the adapter 250 nor may the guide pin 241 become aligned with the circumferential section 272 of the movement control slot 270.

As stated above, one of the sidewalls 258 of engagement section 254 of the adapter 250 is aligned with the bores 238 of support member 230 when the valve handle assembly 220 is in its locked position. Since the configuration of the valve stem 156 may change depending on the manufacturer of the bottom outlet valve 150, the bore 255 at the second end 253 of the adapter 250 may change in configuration and position based upon the configuration of the valve stem. If the bores 238 of the support member 230 are vertically aligned, one of the sidewalls 258 may remain vertical to engage the locking pin 242. If the sidewalls 258 are positioned in another orientation, the position of the bores 238 may be similarly re-positioned so that the locking pin 242 continues to engage one of the sidewalls when the pin is inserted.

To open the bottom outlet valve 150, locking pin 242 is removed from the locking bores 238. Valve handle 31, and thus travel control shaft 260, is slid towards the bottom outlet valve 150 so that the guide pin 241 slides along the axial section 271 of the movement control slot 270 from generally adjacent the second end 274 until the guide pin is aligned with the circumferential section 272. Valve handle 31 may then be rotated clockwise while the guide pin 241 slides along the circumferential section 272 towards the second end 277 of the slot to open the bottom outlet valve 150. The valve handle assembly 220, and thus bottom outlet valve 150, remain in their open positions due to the guide pin 241 engaging circumferential section 272.

To close the bottom outlet valve 150, the handle 31 is rotated counterclockwise until the guide pin 241 is aligned with the axial section 271 of the movement control slot 270. The handle 31 and travel control shaft 260 are moved axially away from the adapter 250 with the guide pin 241 sliding along the axial section 271 of the movement control slot 270 towards the second end 274 until reaching the second end. The biasing member or spring 291 may be sufficient to axially move the handle 31 and travel control shaft 260. The locking pin 242 is then inserted into the locking bore 238 in the cylindrical tube 231 to prevent unintentional rotation of the adapter 250 and valve stem 156, unintentional movement of the handle 31 and travel control shaft 260 towards the adapter 250, and to prevent the unintentional alignment of the guide pin 241 with the circumferential section 272 of movement control slot 270.

Figure 18:
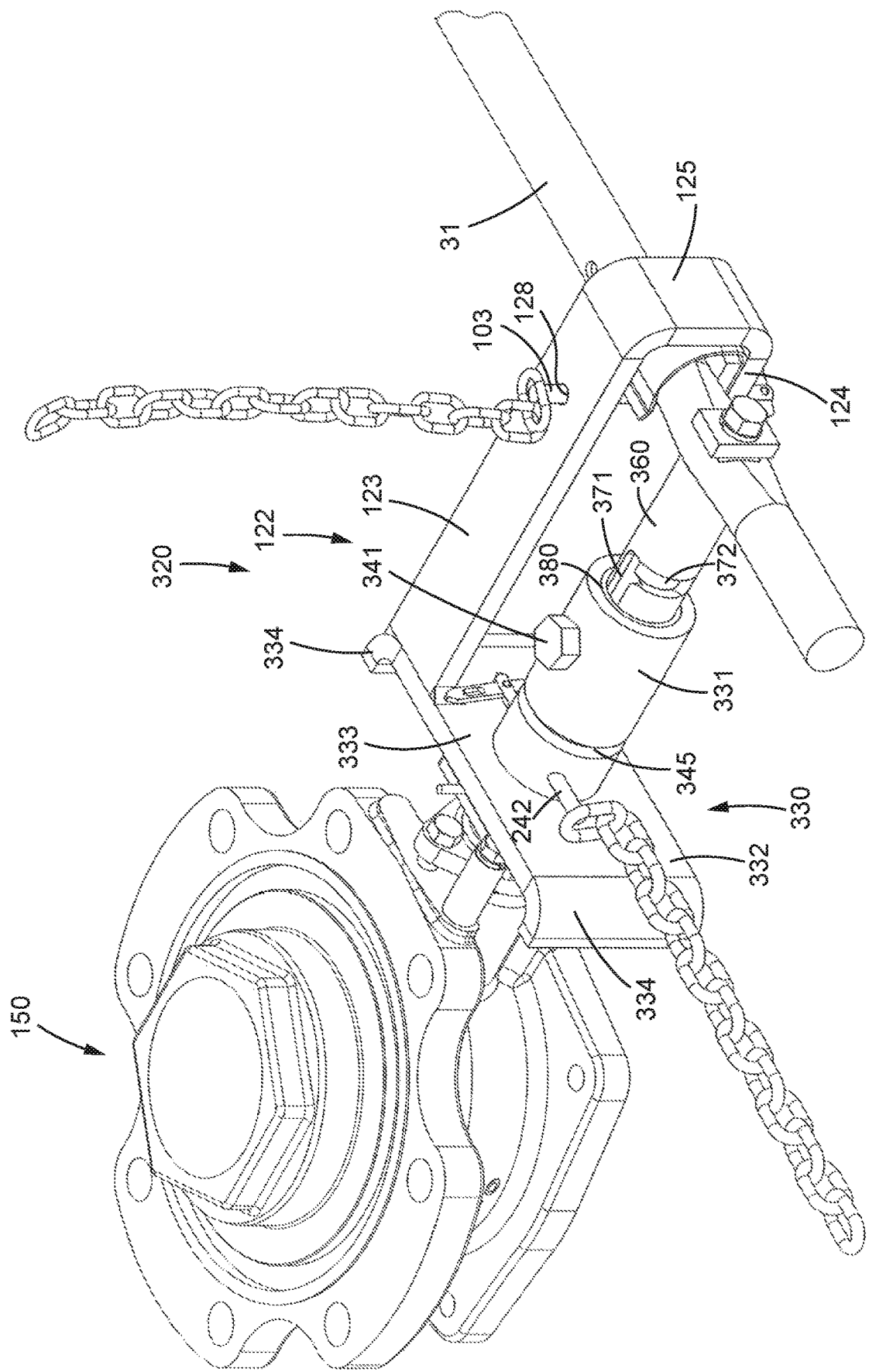
FIG. 18 is a perspective view of a fourth embodiment of a bottom outlet valve and a valve handle assembly at a locked position and with the valve closed.
Figure 19:
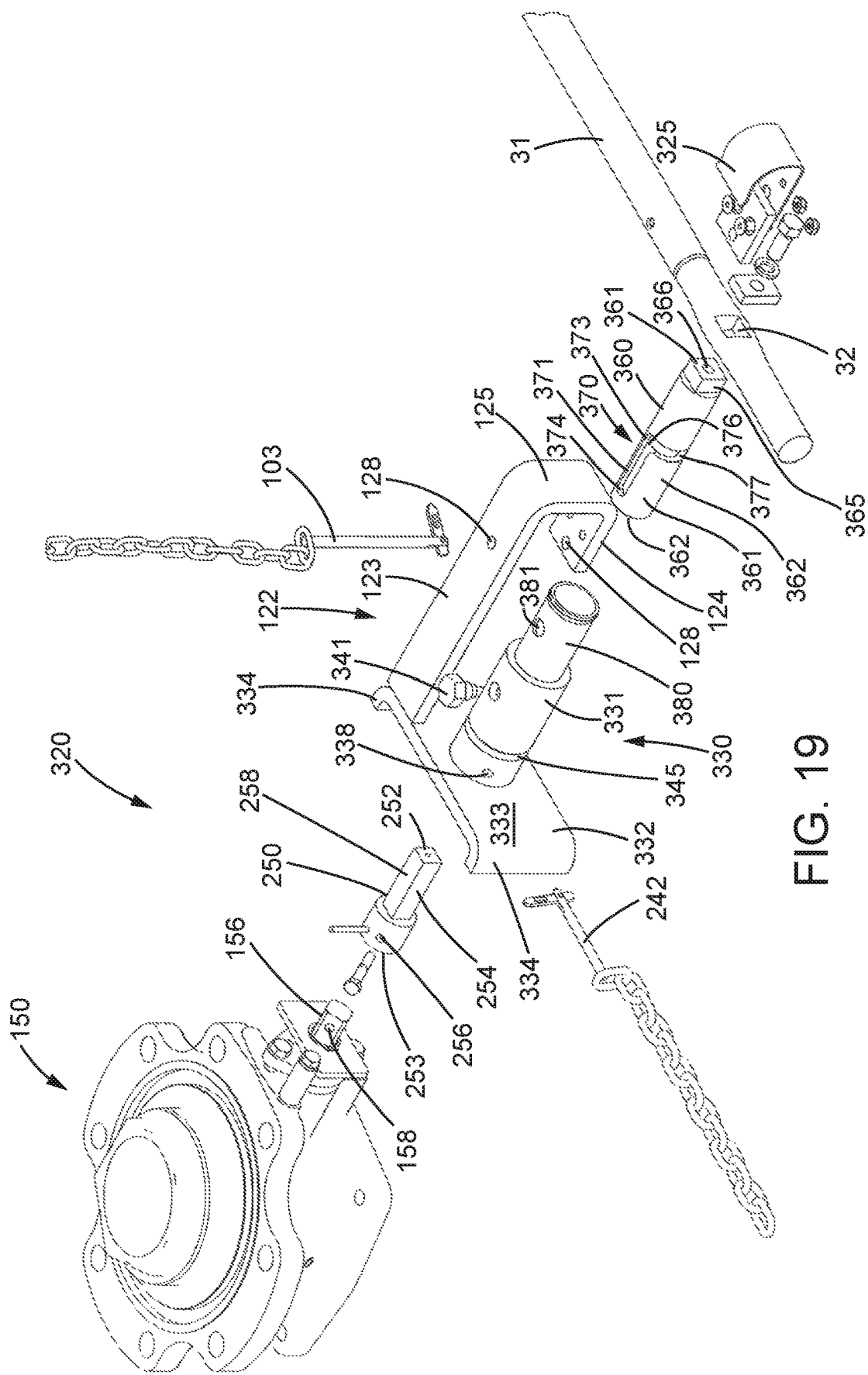
FIG. 19 is an exploded perspective view of the valve handle assembly together with the bottom outlet valve of FIG. 18.

A further alternate embodiment of a valve handle assembly is depicted generally as 320 in FIGS. 18-19. Bottom outlet valve 150 is generally similar to the bottom outlet valve depicted in FIGS. 8-10. Like reference numbers are used to designate like components and the descriptions thereof are not repeated. It should be noted that the portion of the sidewall 210 of the skid plate or skirt 17 depicted in FIGS. 11-12 is omitted from FIGS. 18-19 for clarity.

Valve handle assembly 320 includes a support member 330, an adapter 250, a travel control shaft 360, and a handle 31. Support member 330 includes a generally elongated cylindrical hollow tube or pipe 331 secured to a mounting plate 332. The cylindrical tube 331 may be generally identical to the cylindrical tube 231 described above. As depicted, however, the cylindrical tube 331 has a pair of locking bores 338 (only one being visible in FIGS. 18-19) oriented so that the locking pin 242 may be inserted through the locking bores 338 in a horizontal manner. In addition, the locking bores 338 are located closer to valve stem 156 than V-groove 345 so that if the support member 330 breaks along the V-groove, the locking pin 242 may continue to engage a flat surface of sidewall 258 of the engagement section 254 of adapter 250 to prevent rotation of the adapter and the valve stem.

As depicted, mounting plate 332 has a generally planar base 333 and a pair of curved end sections 334 to space the base 333 from the sidewall 210 of the skid plate 17. The mounting plate 332 may be secured to the sidewall 210 by welding the curved end sections 334 to the sidewall. In another embodiment, the curved end sections 334 may be omitted. In still another embodiment, the sidewall 210 and the mounting plate 332 may have a plurality of holes so that the mounting plate 332 may be mounted to the sidewall 210 with bolts as depicted with respect to the embodiment of FIGS. 11-17.

Mounting plate 332 may have a U-shaped handle locking support 122 secured thereto that is generally identical to that described above with respect to FIGS. 2-7. As depicted, the handle locking support 122 further includes a spring clip 325 to limit movement of the handle 31 when it is secured by the handle locking support.

Adapter 250 may be generally identical to the adapter described above with respect to FIGS. 11-17. In addition, the adapter 250 may further include a position indicator pin 351 to provide a visual indicator of the position of the valve stem 156 and thus the status of the bottom outlet valve 150.

Travel control shaft 360 is similar to travel control shaft 260 but includes a modified movement control slot 370. The travel control shaft 360 includes a generally cylindrical body 361 with an outer surface 362 and has a first end 363 and a second end 364 opposite the first end. The first end 363 has a handle engagement section 365 with a generally square cross-section configured for insertion into bore 32 in handle 31 and a threaded bore 366 extending into the end face of the first end.

The outer surface 362 of travel control shaft 360 has a movement control slot 370 that interacts with the guide bolt 341 of support member 330 to control movement of the valve stem 156. The movement control slot 370 has an axial section 371 and a circumferential section 372. The axial section 371 extends generally parallel to the central axis of the travel control shaft 360 and has a first end 373 that begins generally at the middle of the travel control shaft 360 and a second end 374 generally adjacent, but spaced from, the second end 364 of the travel control shaft.

The circumferential section 372 extends from the first end 373 of the axial section 371 along the outer surface 362 of the travel control shaft 360. The circumferential section 372 has a first end 376 that begins at the axial section 371 and a second end 377 opposite the first end. The axial section 371 and the circumferential section 372 are dimensioned to slidingly receive a portion of guide bolt 341 therein.

If desired, a cylindrical shaft bushing 380 may be positioned within the cylindrical tube 331 to receive the travel control shaft 360 therein and support the shaft for rotation within the cylindrical tube. The bushing 380 may include a bore 381 through which the guide pin 241 extends. It should be noted that the embodiment of FIGS. 18-19 does not include the spring 291 of FIGS. 11-17 and thus there is no biasing force to bias the travel control shaft 360 away from the adapter 250. If desired, the valve handle assembly 320 could include such a spring.

Operation of the valve handle assembly 320 is generally identical to the operation of valve handle assembly 220 except with respect to the additional operations relative to the U-shaped handle locking support 122. Inasmuch as the operation of handle 31 relative to the handle locking support 122 is described above with respect to FIGS. 2-7 and the operation of valve handle assembly 220 is described above with respect to FIGS. 11-17, the operation of valve handle assembly 320 is not repeated herein.

It will be appreciated that the foregoing description provides examples of the disclosed system and technique. All references to the disclosure or examples thereof are intended to reference the particular example being discussed at that point and are not intended to imply any limitation as to the scope of the disclosure more generally. All language of distinction and disparagement with respect to certain features is intended to indicate a lack of preference for those features, but not to exclude such from the scope of the disclosure entirely unless otherwise indicated.

Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context.

Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

The invention claimed is:

1. A handle assembly for an outlet valve of a tank car, the outlet valve having a valve stem rotatable about an axis to open and close the outlet valve,
   a support member for connection to a tank car;
   a shaft supported by said support member for rotational and axial movement;
   an operating handle for said shaft;
   rotation control structure for controlling the rotation of the valve stem, comprising:
   a movement control slot on one of said shaft and support member including an axial section generally parallel to the axis of the valve stem and a circumferential section;
   a movement control guide on the other of said shaft and support member, disposed in said movement control slot; and
   wherein said shaft is axially moveable only when said guide is in said axial section and rotatable only when said guide is in said circumferential section, and
   wherein said shaft is coupled to said valve stem when said guide is in said circumferential section.

2. The handle assembly for an outlet valve of a tank car as claimed in claim 1, wherein said movement control slot is on said support member, and said guide is on said shaft.

3. The handle assembly for an outlet valve of a tank car as claimed in claim 1, wherein said movement control slot is on said shaft, and said guide is on said support member.

4. The handle assembly for an outlet valve of a tank car as claimed in claim 1, wherein said support member includes aligned locking bores to receive a lock pin, and
   a lock pin is insertable through said locking bores in said support member when said outlet valve is closed.

5. The handle assembly for an outlet valve of a tank car as claimed in claim 4,
   wherein said lock pin prevents rotation of said valve stem when said lock pin is disposed in said locking bores of said support member.

6. The handle assembly for an outlet valve of a tank car as claimed in claim 5 wherein said support member is tubular.

7. The handle assembly for an outlet valve of a tank car as claimed in claim 4, wherein said apertures in said support member are offset from the axis of the valve stem.

8. The handle assembly for an outlet valve of a tank car as claimed in claim 7, wherein said lock pin engages the valve stem.

9. The handle assembly for an outlet valve of a tank car as claimed in claim 1, wherein said support member includes aligned locking bores to receive a lock pin, and
   wherein said shaft includes a locking bore, and said lock pin is insertable through said locking bores in said support member and said shaft when said guide is in said axial section.

10. The handle assembly for an outlet valve of a tank car as claimed in claim 1, wherein the valve stem includes a coupling rotatable therewith.

11. The handle assembly for an outlet valve of a tank car as claimed in claim 10, wherein said coupling is axially slidable and biased away from the outlet valve.

12. The handle assembly for an outlet valve of a tank car as claimed in claim 11, wherein said assembly includes a spring between an end of the valve stem and said coupling.

13. The handle assembly for an outlet valve of a tank car as claimed in claim 11, wherein said coupling includes an outer cylindrical surface with a slot therein having an axial section and a circumferential section, and a bracket securable to the outlet valve has a projection slidingly engageable with said slot in said coupling.

14. The handle assembly for an outlet valve of a tank car as claimed in claim 11, wherein said coupling includes a circular flange having a radial notch therein, and a bracket securable to said outlet valve has a locking section engageable with said radial notch of said circular flange.

15. The handle assembly for an outlet valve of a tank car as claimed in claim 14, wherein said locking section of said bracket includes a notch and said circular flange of said coupling is positionable within said notch in said locking section of said bracket.

16. The handle assembly for an outlet valve of a tank car as claimed in claim 1, wherein said assembly includes a biasing member disposed between and end of the valve stem and an end of said shaft.

17. The handle assembly for an outlet valve of a tank car as claimed in claim 16, wherein said biasing member is a compression spring.

18. The handle assembly for an outlet valve of a tank car as claimed in claim 10, wherein said coupling is selectively coupleable to said shaft.

19. The handle assembly for an outlet valve of a tank car as claimed in claim 1, wherein said handle assembly includes a breakage groove in one of said support member and shaft.

20. A handle assembly for an outlet valve of a tank car, the outlet valve having a valve stem rotatable about an axis and being operative to open and close the outlet valve, the handle assembly comprising:
a valve handle for rotating the outlet valve stem;
a rotatable shaft extending from the handle;
said shaft supported in a support tube for axial and rotational movement;
a shaft rotation control structure configured to permit the shaft to move axially generally parallel to the axis of the valve stem between a valve closed position and a shaft rotatable position and to rotate about the axis of the valve stem and relative to said support tube between the valve closed position and a valve open position at the shaft rotatable position,
wherein the shaft is rotatable between the valve closed position and the valve open position only at the shaft rotatable position and
said shaft rotation control structure includes a movement control slot in said support tube having an axial section that is generally parallel to the axis of the stem of the outlet valve and a circumferential section and said shaft includes a guide, said guide disposed within said axial section of said movement control slot when the valve stem is in said valve closed position and disposed in said circumferential section when said shaft is in said shaft rotatable position, and
wherein said shaft is coupled to said valve stem when said guide is in said circumferential section.

21. The handle assembly of claim 20, wherein the valve stem includes a coupling having a bore to slidably receive an end of said rotatable shaft and said rotatable shaft includes an end insertable into said bore in said coupling and said end of said rotatable shaft is received in said bore of said coupling when said shaft is in said rotatable position.

22. A rotation control structure for an outlet valve of a tank car, the outlet valve having a valve stem rotatable about an axis and operative to open and close the outlet valve, a handle for manually operating the outlet valve, a rotatable shaft on said handle, a support member supporting said shaft for axial and rotatable movement relative to said support member, said rotation control structure comprising:
a movement control slot on one of said shaft and support member;
a movement control guide on the other said shaft and support member, said movement control guide disposed within said movement control slot; and
said movement control slot configured to permit said shaft to move axially generally parallel to the axis of the valve stem between a non-rotatable position and a rotatable position and to rotate about the axis of the valve stem relative to said support member between a valve closed position and a valve open position only at the rotatable position, and
wherein said shaft is coupled to said valve stem when said guide is in said circumferential section.

23. The rotation control structure for an outlet valve of a tank car as claimed in claim 22, wherein said movement control slot is in said support member and includes an axial section generally parallel to the axis of the valve stem and a section that is a circumferential section, and wherein said guide is on said shaft and is within said axial section of said movement control slot when the valve stem is in the valve closed position.

24. The rotation control structure for an outlet valve of a tank car as claimed in claim 22, wherein said support member includes aligned locking bores to receive a lock pin, and
wherein said shaft includes a locking bore, and said lock pin is insertable through said locking bores in said support member and said shaft when said guide is in said axial section.

25. The rotation control structure for an outlet valve of a tank car as claimed in claim 24, wherein said movement control slot is in said support member and includes an axial section generally parallel to the axis of the valve stem and a section that is a circumferential section, and wherein said guide is on said shaft and is within said axial section of said movement control slot when the valve stem is in the valve closed position, and wherein the valve stem includes a coupling rotatable therewith, and said coupling is selectively coupleable to said shaft.

* * * * *